US012782736B2

(12) United States Patent
Sluka

(10) Patent No.: US 12,782,736 B2
(45) Date of Patent: Nov. 3, 2026

(54) NEAR-EYE SEQUENTIAL LIGHT-FIELD PROJECTOR WITH CORRECT MONOCULAR DEPTH CUES

(71) Applicant: Creal SA, Ecublens VD (CH)

(72) Inventor: Tomas Sluka, Lausanne (CH)

(73) Assignee: Creal SA, Ecublens VD (CH)

( * ) Notice: Subject to any disclaimer, the term of this patent is extended or adjusted under 35 U.S.C. 154(b) by 244 days.

(21) Appl. No.: 18/622,690

(22) Filed: Mar. 29, 2024

(65) Prior Publication Data

US 2024/0255762 A1 Aug. 1, 2024

Related U.S. Application Data

(63) Continuation of application No. 16/348,768, filed as application No. PCT/IB2017/055664 on Sep. 19, 2017, now Pat. No. 11,960,083.

(Continued)

(51) Int. Cl.

*G02B 27/01* (2006.01)
*G02B 27/00* (2006.01)

(52) U.S. Cl.

CPC ..... *G02B 27/0172* (2013.01); *G02B 27/0075* (2013.01); *G02B 2027/0127* (2013.01);

(Continued)

(58) Field of Classification Search

CPC ............ G02B 27/0172; G02B 27/0075; G02B 2027/0127; G02B 2027/0134; G02B 2027/0178

See application file for complete search history.

(56) References Cited

U.S. PATENT DOCUMENTS 9,488,837 B2 11/2016 Nister et al.
10,359,630 B2 7/2019 Raval et al.

(Continued)

FOREIGN PATENT DOCUMENTS

CN 1828381 A 9/2006
CN 101855902 A 10/2010

(Continued)

OTHER PUBLICATIONS

International Search Report and Written Opinion for PCT/IB2017/055664 dated Jan. 8, 2018, 16 pages.

(Continued)

*Primary Examiner* — Nathanael R Briggs
(74) *Attorney, Agent, or Firm* — BLANK ROME LLP

(57) ABSTRACT

Light-field projector for projecting a near-eye projected image to the eyes of a user, comprising: a light source comprising a plurality of illumination point-lights configured for sequentially emitting a plurality of incident light fields; a spatial light modulator configured for providing a sequence of source images; the spatial light modulator being further configured for modulating each of the incident light-fields in accordance with the source images such as to project sequentially a plurality of pinhole-aperture light-fields, each pinhole-aperture light-fields carrying a light-field component from the source image; wherein each sequentially projected pinhole-aperture light-field forms an intersection virtual pinhole through which the component from the source image can be seen, each virtual pinholes having an aperture stop which is determined by the size of the illumination point-light and being spatially shifted in relation with each other, the near-eye projected image being seen through the plurality of virtual pinholes.

16 Claims, 16 Drawing Sheets

Related U.S. Application Data

(60) Provisional application No. 62/422,373, filed on Nov. 15, 2016.

(52) U.S. Cl.
CPC ................ *G02B 2027/0134* (2013.01); *G02B 2027/0178* (2013.01)

(56) References Cited

U.S. PATENT DOCUMENTS

| | | | | |
|---|---|---|---|---|
| 10,447,978 | B2 | 10/2019 | Sieler | |
| 11,237,403 | B2 | 2/2022 | Schowengerdt | |
| 2003/0137730 | A1 | 7/2003 | Fridman et al. | |
| 2004/0085648 | A1 | 5/2004 | Tomono | |
| 2009/0015917 | A1 | 1/2009 | Iwamoto et al. | |
| 2015/0002940 | A1 | 1/2015 | Nister et al. | |
| 2015/0241701 | A1 | 8/2015 | Schowengerdt | |
| 2015/0241707 | A1 | 8/2015 | Schowengerdt | |
| 2016/0320620 | A1* | 11/2016 | Maimone | G02B 6/0008 |

FOREIGN PATENT DOCUMENTS

| | | | |
|---|---|---|---|
| CN | 104007552 | A | 8/2014 |
| CN | 105676472 | A | 6/2016 |
| CN | 105934902 | A | 9/2016 |
| JP | 2000121992 | A | 4/2000 |
| JP | 2009288759 | A | 12/2009 |
| WO | WO-2016/105281 | A1 | 6/2016 |

OTHER PUBLICATIONS

A. Maimone et al., "Pinlight Displays: Wide Field of View Augmented Reality Eyeglasses Using Defocused Point Light Sources." ACM Transactions on Graphics, vol. 33, No. 4, Jul. 27, 2014, pp. 1-11.

A. Maimone et al., "High Efficiency Near-Eye Light Field Display." ACM Transactions on Graphics, https://cs.unc.edu/~maimone/media/Maimone_GTQ2015.pdf; 1 page.

* cited by examiner

NEAR-EYE SEQUENTIAL LIGHT-FIELD PROJECTOR WITH CORRECT MONOCULAR DEPTH CUES

RELATED APPLICATIONS

This application is a continuation of U.S. application Ser. No. 16/348,768, filed May 9, 2019, which is a national phase of PCT/IB2017/055664, filed on Sep. 19, 2017, which claims U.S. Provisional Application No. 62/422,373, filed on Nov. 15, 2016. The entire contents of these applications are hereby incorporated by reference.

FIELD

The present invention concerns a light-field projector for projecting a virtual image to the eyes of a user having optimized monocular depth cues. The present invention further relates to an augmented reality device comprising said light-field projector.

DESCRIPTION OF RELATED ART

Conventional three-dimensional (3D) displays and projectors provide the illusion of depth in projected images mostly by binocular cues and, in case of head mounted displays and near-eye projectors with a motion tracking ability, also motion cues. Another minor depth cues are typically present as well. Stereoscopic 3D displays and projectors deliver to each of the viewer's eyes an image which corresponds to the image of a 3D scene as seen from the different viewpoint of each eye and, if possible, change the images according to the motion of the viewer's head in order to imitate his changing viewpoint in an artificially generated 3D scene. In conventional 3D displays and projectors, the binocular and motion depth cues are usually in conflict with monocular depth cues such as an eye accommodation and an image blur associated due to a finite depth of field.

An eye contains a variable lens which—in an actual world—must be focused on the distance of the observed object in order to project its sharp image on an eye retina. Objects in another distances are out of focus and their image on a retina is blurred. The conventional 3D displays and projectors however provide an image to each eye from a planar screen or by a direct retinal projection using a scanning laser beam or a light-field with almost zero aperture stop. The former requires that an eye is focused on the distance of the optical image of the planar screen in an optical system. Here and hereafter, the term "optical image" means the apparent position of an object as seen through an optical system. Pictures displayed on the planar screen are either all sharp or a blur is already present in them and cannot be unblurred with an eye accommodation. When an eye focuses on any other distance than that of the optical image of the display, the retinal image of the displayed pictures is blurred. The retinal projection creates an always-in-focus image of the projected picture on a retina and the eye accommodation influences only the image size and position. An always-in-focus light-field carries shadows of all imperfections such as dust specks in the optical path.

Several concepts to create correct monocular depth cues in an artificially projected light of a 3D scene were suggested; including (i) holographic displays; (ii) near-eye projectors with fast vari-focal optical elements such as a free-form mirror combined with a display such as Digital Micromirror Device (DMD); (iii) displays with optics which actively controls the distance of the optical image of the display and creates corresponding blur in the displayed pictures according to the measured or estimated focal length of an eye; (iv) displays, which spatially multiplex displayed pictures by a microlens array or point-light array back-light. Each of the concepts have certain advantages and disadvantages. Holographic displays are, in theory, able to provide full correct light-field of an artificial 3D scene, but they suffer from diffraction and chromatic artifacts, require a large amount of input data, coherent light sources, and high-resolution phase and amplitude modulation of light. The fast vari-focal lenses and free-form mirrors are delicate components that are not mass produced and their optical properties suffer from optical imperfections. Projectors with actively controlled distance of the optical image of a screen and the artificial blur in the displayed pictures requires measurement or estimation of a focal length of an eye and the consequent adaptation of the projector optics and digital blur. This concept suffers from measurement errors complicated by differences between individual eyes, and it indeed does not provide a correct light-field, it only imitates the effects of a light-field. Achieving commercially attractive image resolution with the concept of spatial multiplexing of images by microlens array or point-light backlight with transparent spatial light modulator requires special small pitch high-resolution displays because each image point of an artificial scene is displayed multiple-times at the same moment in order to make the blur in the retinal image correctly dependent on the focal length of an eye. Their use as see-through displays in augmented reality applications is complicated by the fact that the microlens array concept includes a non-transparent display and the point-light array concept is bulky. Multiple other concepts based on temporal multiplexing of images with nematic liquid crystal or organic light emitting diode displays suffer from small refresh times of these displays.

Conventional displays and projectors do not produce light-field with correct monocular depth cues. Light-field displays and projectors that are known to be under development are based on special components, do not have satisfactory parameters, or are not doable in near future due to technical limitations. See more details below.

SUMMARY

The present invention relates to electronic and optic devices which project digitally processed information to the eyes of a user. More specifically it relates to the devices which create light of a visual scene and project the light from close proximity of the eyes to the eyes. The projected light can be superimposed with the natural light entering the eyes from the real world. The projected artificial light has such properties that the receiving eye can naturally change focus on different distances of objects in the projected visual scene as well as in the real world and can observe their realistic blur and depth of field. The invention relates also to the devices which have a small form factor and can be used as everyday wearable eyewear which superimposes contextual digital information into the naturally observed real world.

The purpose of this invention is to create an artificial light-field and deliver the light-field to an eye of a viewer. More particularly, the light-field projection is configured in a small form-factor device which projects the light-field from the proximity of an eye to the eye and is able to mix the projected light-field with the light which enters the eye pupil of a viewer from the real world.

The disclosed invention is a near-eye light-field projector which provides correct monocular depth cues to a viewer. The projector generates an artificial light-field by temporal-multiplexing and sequential projection of plurality of always-in-focus light-field components into a pupil of a viewer. Due to the natural vision latency, the viewer perceives composed light-field and experiences realistic monocular depth cues such as a correct eye accommodation and the associated image blur.

The near-eye light-field projector disclosed in this invention produces a light-field with realistic monocular depth cues which creates viewer's perception of the realistic finite depth of field and correct accommodation in an artificially generated 3D scene. The light-field projector provides practically infinite and almost continuous range of depths, high image resolution, low image persistence, is doable with reliable currently mass produced components, and it can be embedded in a system with thin transparent glasses for an augmented reality application.

The projector provides light-field of a 3D scene to the eyes of any human or animal.

A user of the light-field projector experiences realistic monocular depth cues in the projected light-field. The projector is suitable for delivery of 3D virtual and augmented reality information with the comfort of the correct eye accommodation.

BRIEF DESCRIPTION OF THE DRAWINGS

The invention will be better understood with the aid of the description of an embodiment given by way of example and illustrated by the figures, in which:

FIG. 1*le* shows a front view of the light-field projector, according to another embodiment;

DETAILED DESCRIPTION OF POSSIBLE EMBODIMENTS

Figure 1A:
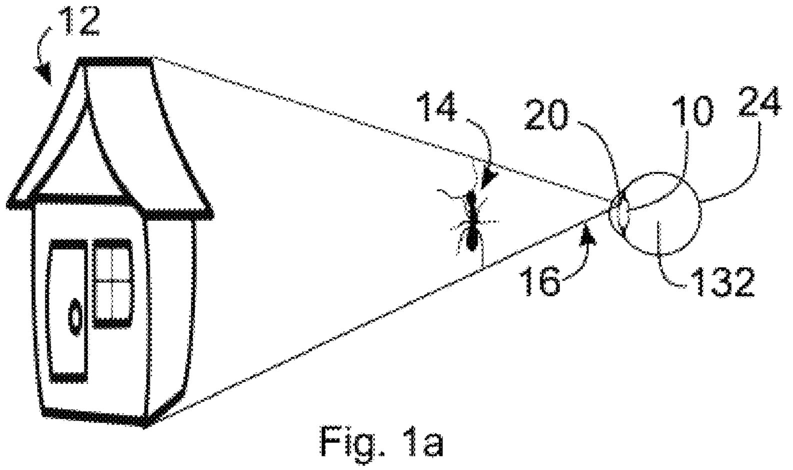
Figure 1*a* illustrates the projection of a pinhole-aperture light-field, according to an embodiment.
Figure 1B:
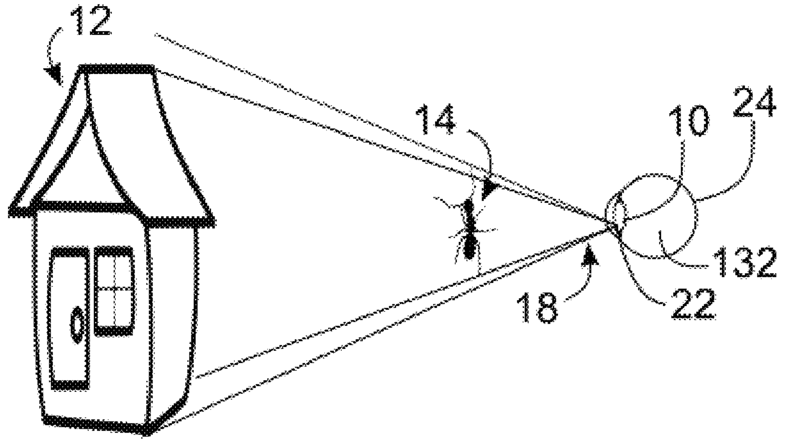
FIG. 1*b* illustrates the projection of another pinhole-aperture light-field, according to an embodiment.
Figure 1C:
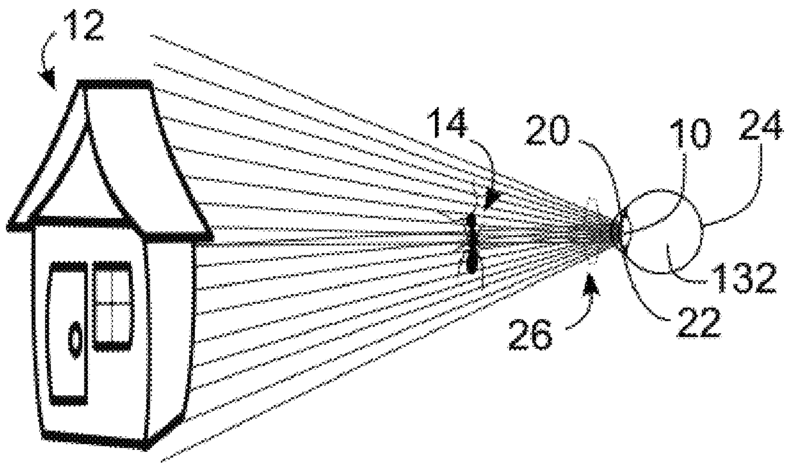
FIG. 1*c* illustrates a wide-aperture light-field from plurality of pinhole-aperture light-fields, according to an embodiment.

FIG. 1*a* is an illustration of the projection of a pinhole-aperture light-field 16 from a 3D scene with objects 12 and 14 through a virtual pinhole 20 into the eye pupil 10 and onto the retina 24, according to embodiment. FIG. 1*b* is an illustration of the projection of another pinhole-aperture light-field 18 from a 3D scene with objects 12 and 14 through another virtual pinhole 22 into the eye pupil 10 and onto the retina 24 and FIG. 1*c* is an illustration of the composition of a wide-aperture light-field 26 from plurality of pinhole-aperture light-fields.

The pupil 10 is an eye pupil of a typical diameter between 2 to 8 mm. The distant object 12 is any object located in a virtual 3D scene in a larger distance than a near object 14. The near (or near eye) object 14 is an object located in a virtual 3D scene. The pinhole-aperture light-field 16 is a radial light-field with almost zero diameter of its aperture stop which is determined by the size of a point-light source or a pinhole filter, and it carries a light-field component from a 3D scene which is supposed to be seen through the virtual pinhole 20. Another pinhole-aperture light-field 18 is a radial light-field with almost zero diameter of its aperture stop whose virtual pinhole 22 is in another location than the virtual pinhole 20. The virtual pinhole 20 is an intersection point of the rays of the radial pinhole-aperture light-field 16. It is a modulated image of a point-light source or a pinhole. Another virtual pinhole 22 is an intersection point of the rays of the radial pinhole-aperture light-field 18. The retina 24 is the light-sensing part of an eye. The wide-aperture light-field 26 is a light-field with enough large aperture stop that its light enters at least partly an eye pupil 10. For this purpose the exit pupil given by the diameter of its aperture stop is preferably between 5 and 100 mm.

The rays 27 are the rays of a light-field after reflection from SLM.

Figure 2A:
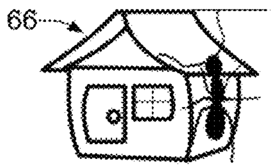
FIG. 2*a* shows a retinal image of a pinhole-aperture light-field, according to an embodiment.
Figure 2C:
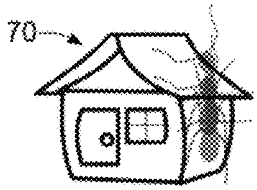
FIG. 2*c* shows a retinal image composed of two pinhole-aperture light-fields, according to an embodiment.
Figure 2D:
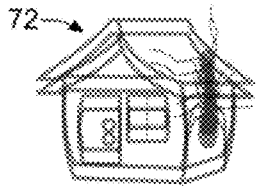
FIG. 2*d* shows a retinal image composed of two pinhole-aperture light-fields, according to another embodiment.
Figure 2E:
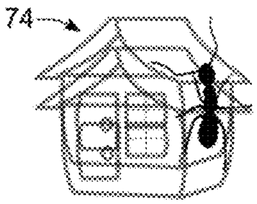
FIG. 2*e* shows a retinal image composed of two pinhole-aperture light-fields, according to another embodiment.
Figure 2B:
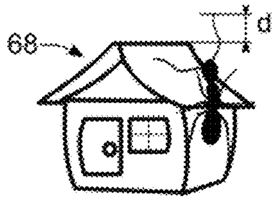
FIG. 2*b* shows a retinal image of another pinhole-aperture light-field, according to an embodiment.

FIG. 2*a* shows a retinal image 66 (corresponding to a projected image) of the pinhole-aperture light-field 16 and FIG. 2*b* shows a retinal image 68 of another pinhole-aperture light-field 18. FIG. 2*c* shows a retinal image 70 composed of two pinhole-aperture light-fields 16 and 18 when an eye 132 is focused on the distant object 12. FIG. 2*d* is a retinal image 72 composed of two pinhole-aperture light-fields 16 and 18 when an eye 132 is focused between the distant object 12 and the near object 14. FIG. 2*e* is a retinal image 74 composed of two pinhole-aperture light-fields 16 and 18 when an eye 132 is focused on the near object 14.

Figure 3A:
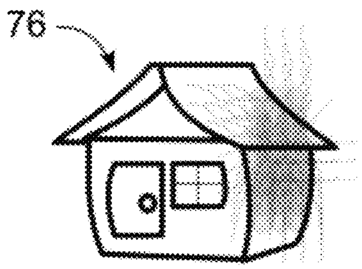
FIGS. 3*a* shows a retinal image of a light-field composed of nine pinhole- aperture light-fields, according to an embodiment.
Figure 3B:
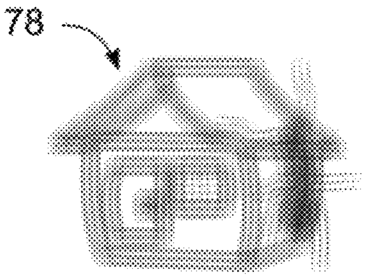
FIGS. 3*b* shows a retinal image of a light-field composed of nine pinhole- aperture light-fields, according to another embodiment.
Figure 3C:
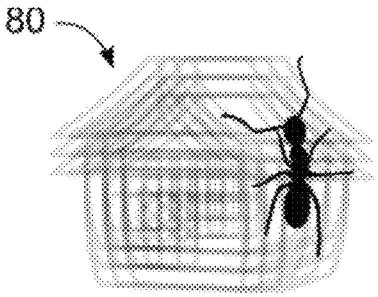
FIGS. 3*c* shows a retinal image of a light-field composed of nine pinhole- aperture light-fields, according to another embodiment.
Figure 3D:
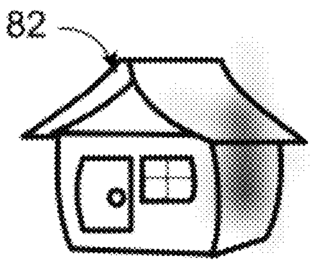
FIGS. 3*d* shows a retinal image of the light-field composed of hundred pinhole- aperture light-fields, according to an embodiment.
Figure 3E:
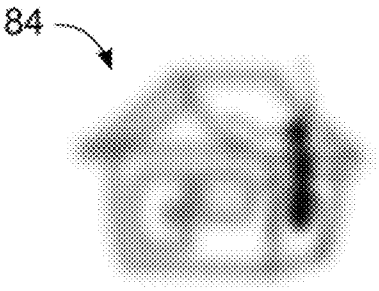
FIGS. 3*e* shows a retinal image of the light-field composed of hundred pinhole- aperture light-fields, according to another embodiment.
Figure 3F:
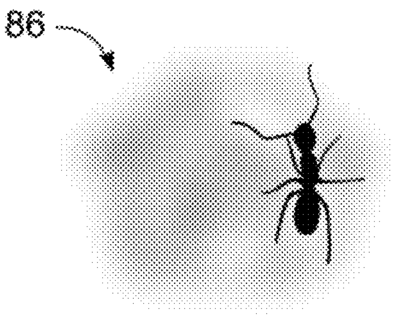
FIGS. 3*f* shows a retinal image of the light-field composed of hundred pinhole- aperture light-fields, according to another embodiment.

FIG. 3*a* is a retinal image 76 of a light-field composed of nine pinhole-aperture light-fields when an eye 132 is focused on the distant object 12. FIG. 3*b* shows a retinal image 78 of a light-field composed of nine pinhole-aperture light-fields when an eye 132 is focused between the 12 and 14. FIG. 3*c* shows a retinal image 80 of a light-field composed of nine pinhole-aperture light-fields when an eye 132 is focused on the near object 14. FIG. 3*d* shows a retinal image 82 of the light-field composed of hundred pinhole-aperture light-fields when an eye 132 is focused on the distant object 12. FIG. 3*e* is a retinal image 84 of the light-field composed of hundred pinhole-aperture light-fields when an eye 132 is focused between the objects 12 and 14 and FIG. 3*f* shows a retinal image 86 of the light-field composed of hundred pinhole-aperture light-fields when an eye 132 is focused on the near object 14.

Figure 4A:
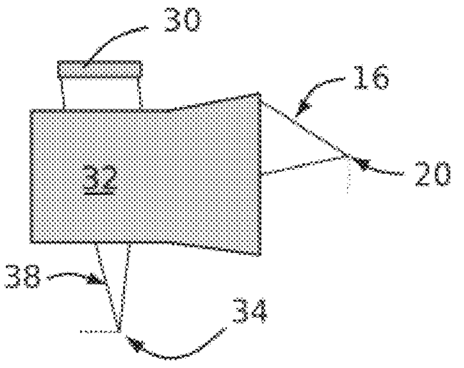
FIG. 4*a* represents a schematic view of a light-field projector during an illumination step, according to an embodiment.
Figure 4B:
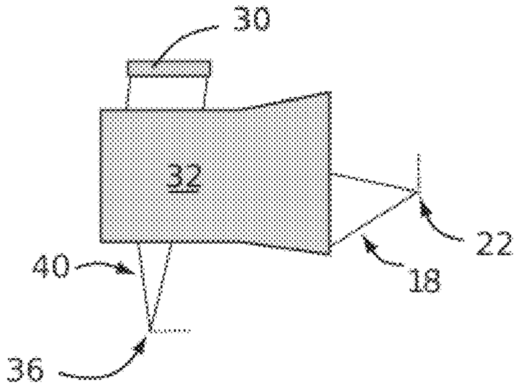
FIG. 4*b* represents a schematic view of the light-field projector of FIG. 4*a*, during another illumination step.
Figure 4C:
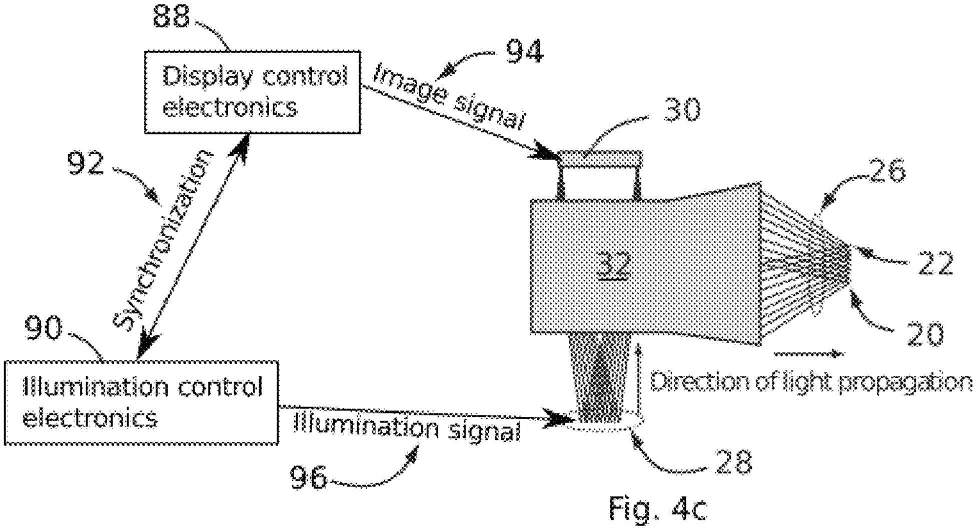
FIG. 4*c* represents a schematic view of the light-field projector of FIG. 4*a*, showing a plurality of illumination steps.

FIG. 4*a* is a diagram of one illumination step which produces a pinhole-aperture light-field 16 from an incident radial light-field 38 that is produced by point-light 34, guided through the optics 32, and modulated by reflection from a Spatial Light Modulator (SLM) 30. FIG. 4*b* is a diagram of another illumination step which produces a pinhole-aperture light-field 18 from an incident radial light-field 40 that is produced by another point-light 36, guided through the optics 32, and modulated by reflection from the SLM 30. FIG. 4*c* is a diagram of composition of a wide-aperture light-field 26 from sequential projection of plurality of pinhole-aperture light-fields.

The point-light array 28 is an array of point-light sources distributed on a two-dimensional plane. The point-light array 28 can be also one or three-dimensional in other embodiments.

The SLM 30 is a fast reflective Spatial Light Modulator such as DMD or Ferroelectric Liquid Crystal on Silicon (FLCOS). The guiding optics 32 is a set of optical elements which guides the light from the point-light array 28 to the SLM 30 and to the pupil 10. The point-light 34 is a source of light with small diameter such as a light emitting diode with a pinhole mask or an exit of an optical fiber or another small diameter light source. Another point-light 36 is a source of light with small diameter which is located in another place than the point-light 34.

The incident light-field 38 is a light-field of radial rays emitted from the point-light 34. Another incident light-field 40 is a light-field of radial rays emitted from another point-light 36.

Figure 9:
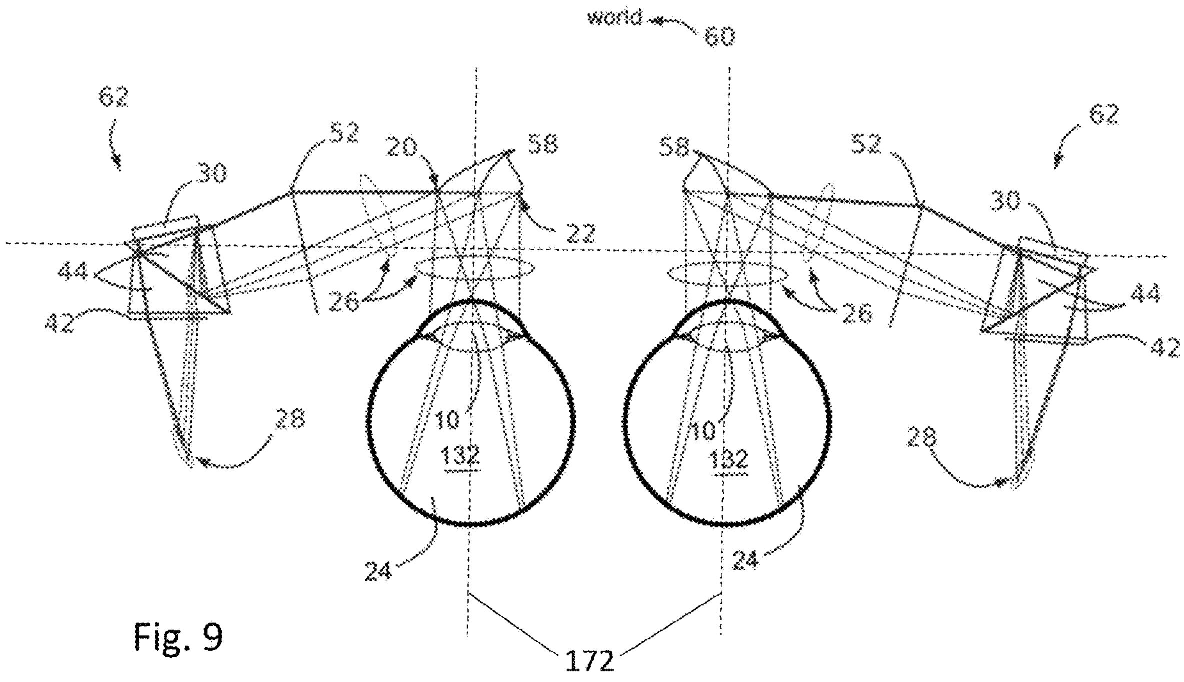
FIG. 9 shows the light-field projector, according to another embodiment.
Figure 12A:
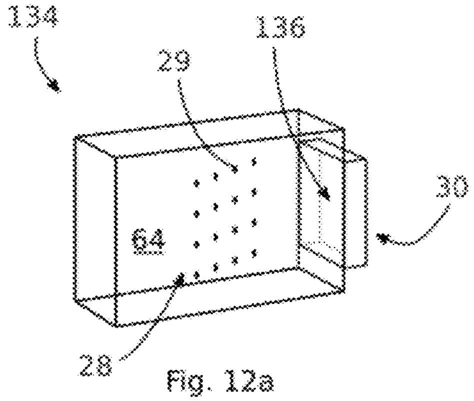
FIG. 12*a* represents the light-field projector, according to yet another embodiment.
Figure 12B:
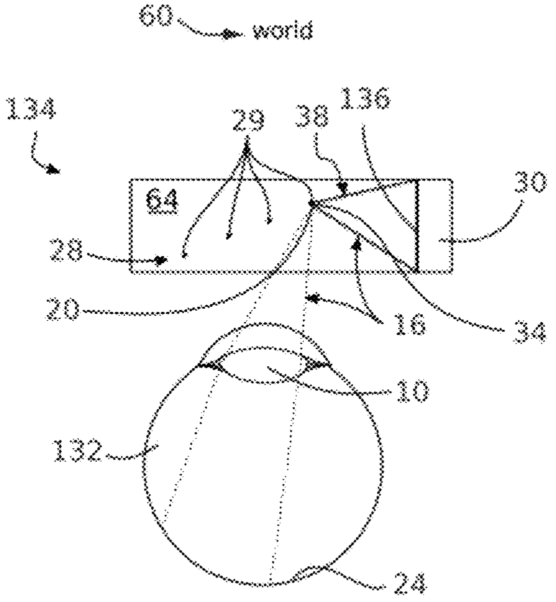
FIG. 12*b* represents shows a top view of the light-field projector, according to another embodiment.
Figure 12C:
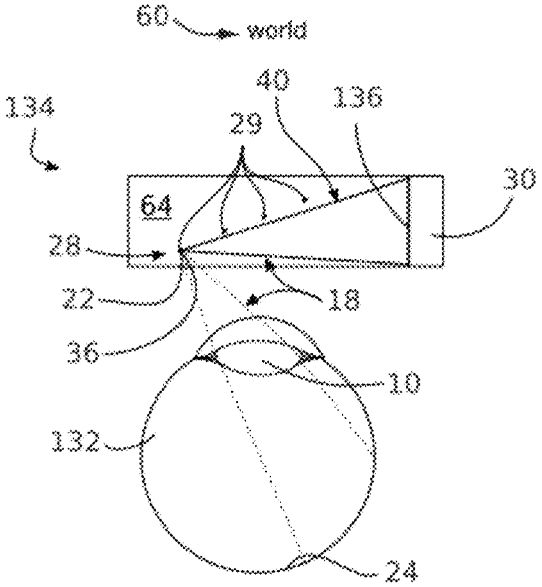
FIG. 12*c* represents shows a top view of the light-field projector, according to another embodiment.
Figure 12D:
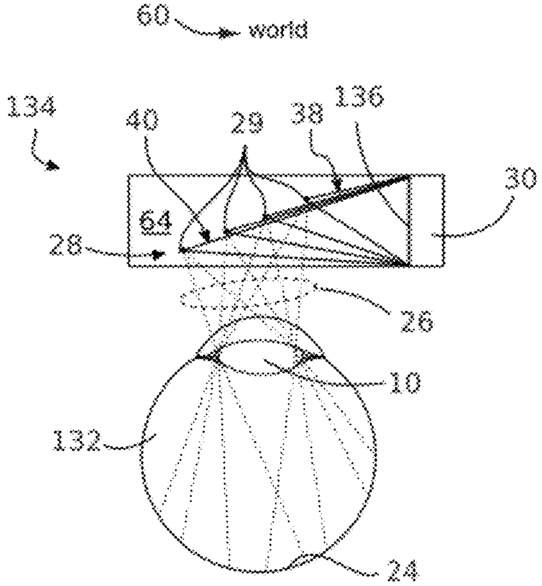
FIG. 12*d* represents shows a top view of the light-field projector, according to another embodiment.
Figure 12E:
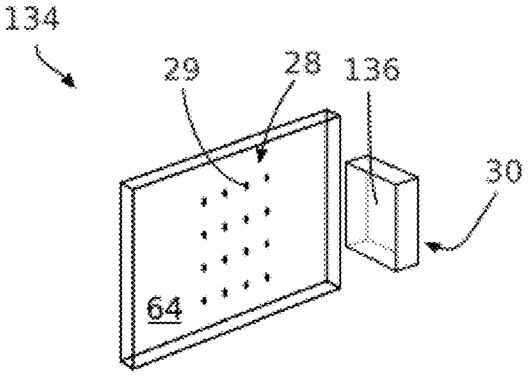
FIG. 12*e* represents the light-field projector, according to yet another embodiment.
Figure 12F:
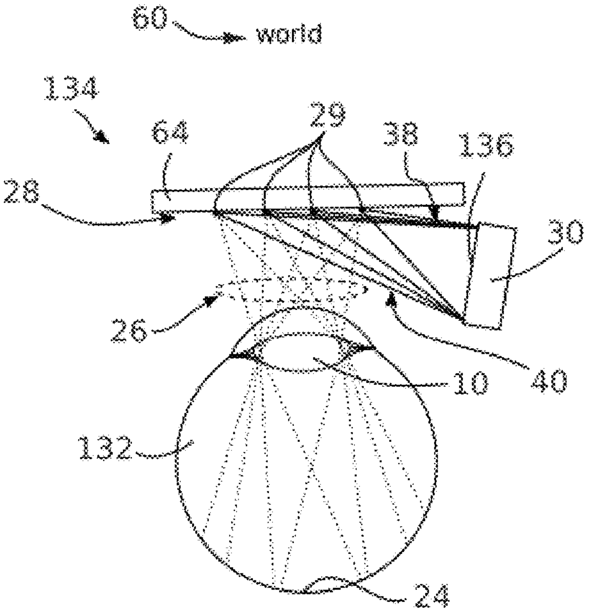
FIG. 12*f* represents shows a top view of the light-field projector, according to another embodiment.
Figure 12G:
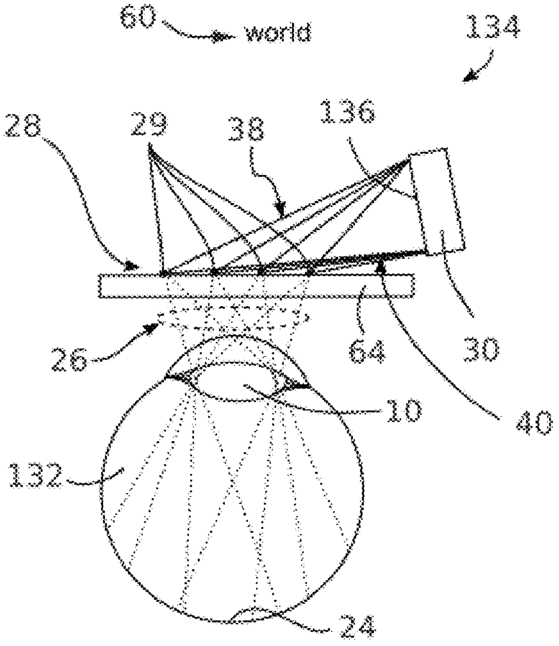
FIG. 12*g* represents shows a top view of the light-field projector, according to another embodiment.
Figure 13A:
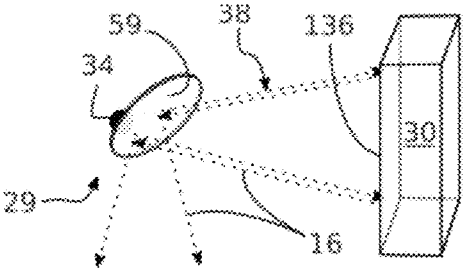
FIG. 13*a* represents an element comprising a point-light source in the light-field projector, according to an embodiment.

The element 29 (see FIGS. 11*a*-11*e*, 12*a*-12*g*, and 13*a*-13*g*) is a composed object comprising essentially a source of light 34 and a fully transparent mirror 58 or semi-transparent mirror 59 (see FIGS. 9 and 13*a*-13-*g*). An array of plurality of elements 29 then represents the array of plurality of point-light sources 28 and, at the same time, a reflective Fourier filter which performs the function of Fourier filter 54 (see FIG. 6).

The source of collimated light 37 is, for example, a laser source or collimated light from an incoherent point light source which illuminates a diffusing element 148 (see FIGS. 13*d* and 13*e*) in an element 29 which converts the collimated light beam into a uniform radial light-field.

The rays 41—are the rays of incident radial light-field from a light-source such as 34.

Figure 5A:
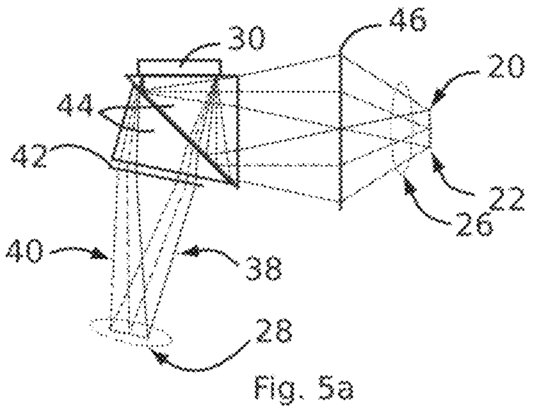
FIG. 5*a* represents the light-field projector, according to another embodiment.
Figure 5B:
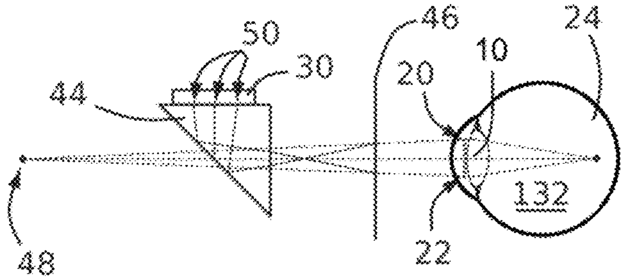
FIG. 5*b* represents the light-field projector of FIG. 5*a*, during a sequential projection.

FIG. 5*a* is a particular preferred embodiment of the light-field projector with a reflective SLM 30, a total internal reflection prism 44, a collimator 42 and an eyepiece optics 46. FIG. 5*b* is a diagram of production of the light-field of a virtual point object 48 by sequential projection of plurality of its rays by reflection of an incident light from SLM 30 displaying the source images of the virtual point 50.

The collimator 42 is an optional convex lens which transforms an incident radial narrow-aperture light-field into a light-field with parallel rays and, therefore, planar waves. The total internal reflection prism 44 is an optical element which reflects light rays with larger than total reflection angle. The eyepiece 46 is an optical element, such as a convex lens, mirror or set of lenses or mirrors, which concentrates an incident light into a light-field cone which enters at least partly the eye pupil 10. The virtual point object 48 is any point in a virtual 3D scene. The source images of the virtual point 50 is a sequence of images of the virtual point object 48 on the SLM 30.

Figure 6:
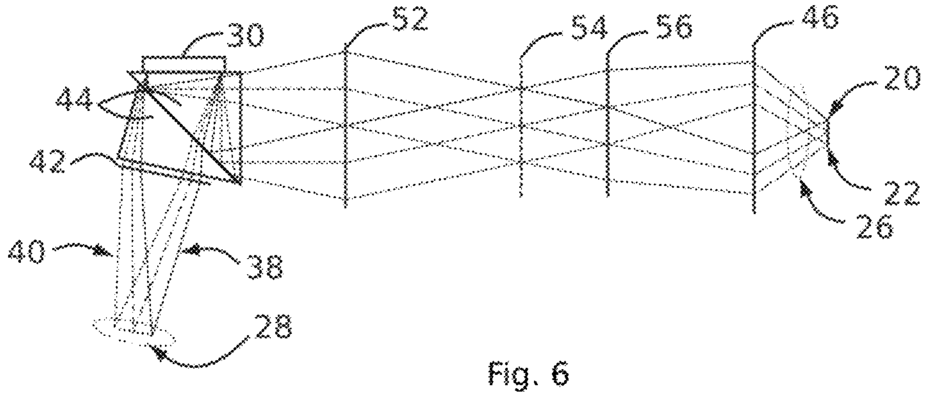
FIG. 6 represents the light-field projector, according to another embodiment.

FIG. 6 is an alternative embodiment of the light-field projector with additional optics 52 and 56 and a Fourier filter 54.

The convex lens 52 is an optical element which performs optical Fourier transformation of the light-field which enters it. The adjusting lens 56 is any optical element which adjusts propagation of the projected light-field and improves some parameters of the projected light-field.

Figure 7A:
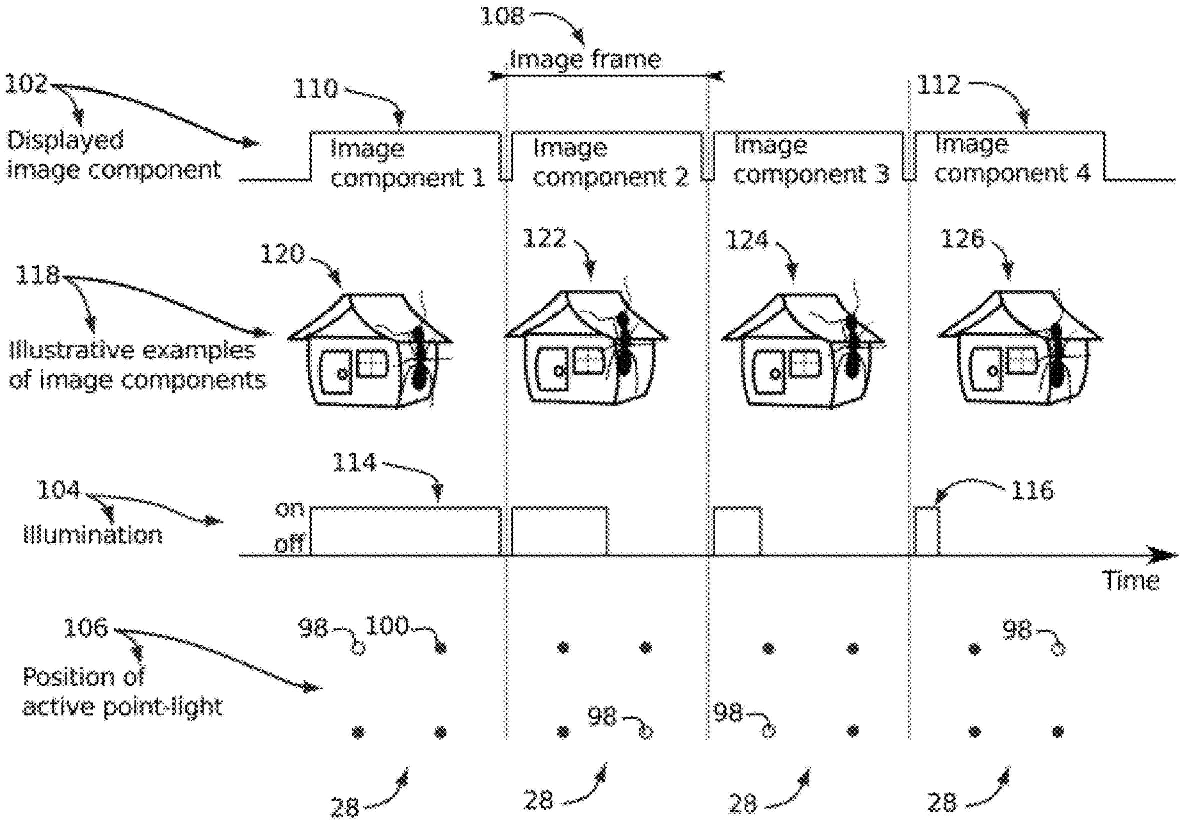
FIG. 7*a* shows a sequential illumination steps, according to an embodiment.

FIG. 7*a* is a diagram of particular sequential illumination of SLM 30 shown on an example of four point-lights 28 and four image components.

Figure 7B:
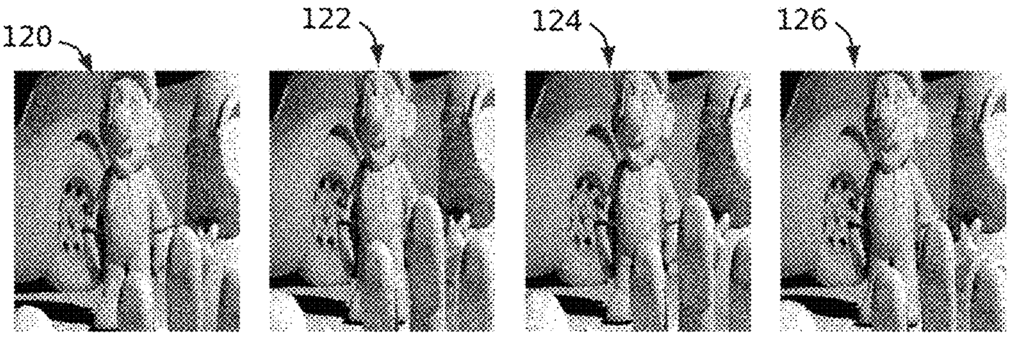
FIG. 7*b* shows four halftone image components, according to an embodiment.

FIG. 7*b* is an example of four halftone image components displayed at SLM 30 for individual active point lights in the point-light array 28.

Figure 8:
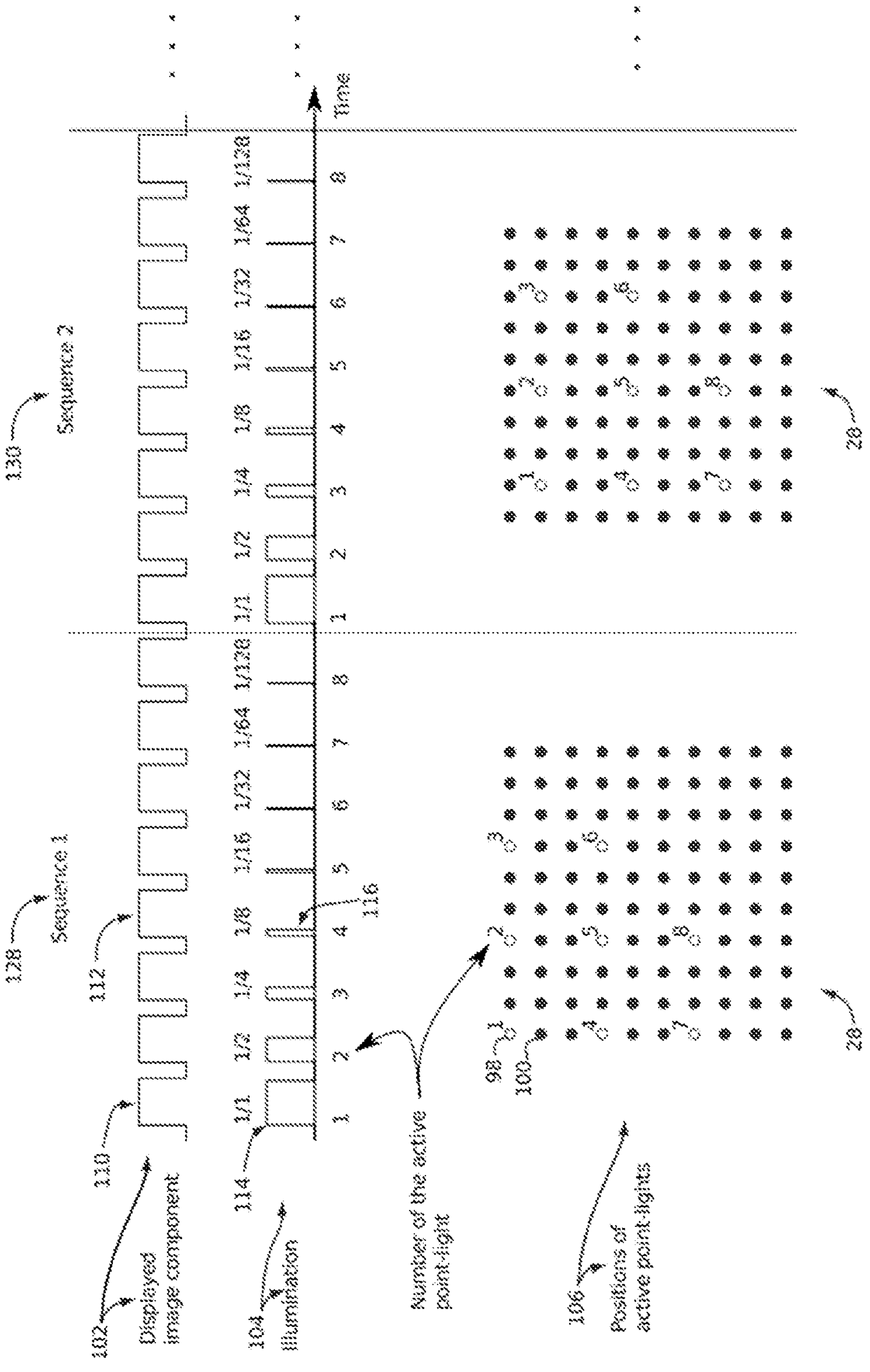
FIG. 8 shows a sequential illumination steps, according to another embodiment.

FIG. 8 shows a diagram of a particular temporal mixing of illumination of SLM 30 between illumination sequences.

FIG. 9 shows an alternative embodiment of the light-field projector with inclined point-light array 28 and inclined mirrors 58 for incorporation of the projector in a stereoscopic augmented reality system observing an actual world 60 (distant image from objects at distance vision) through transparent glasses.

Figure 10:
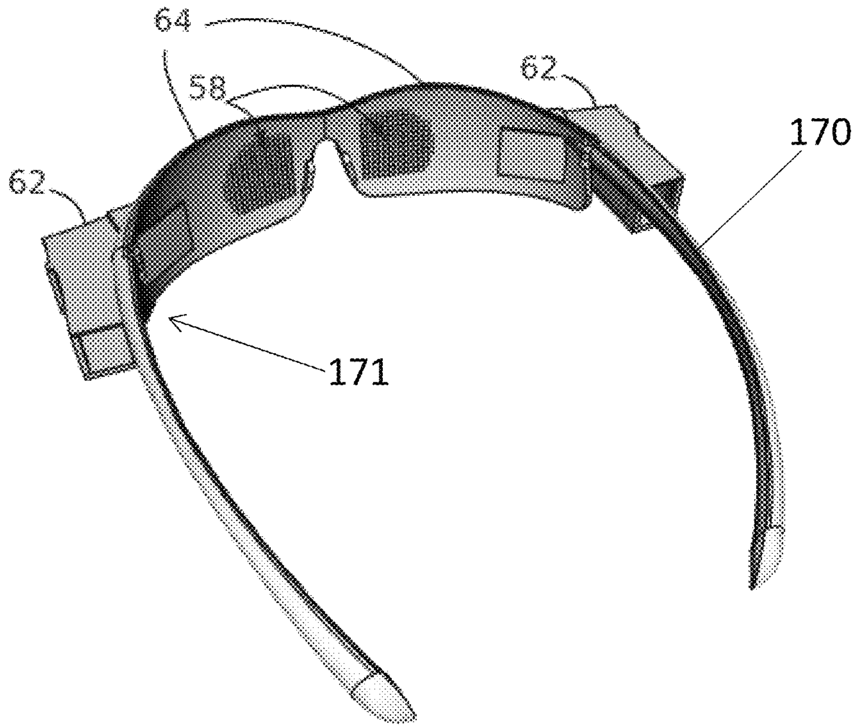
FIG. 10 represents an augmented reality device, according to an embodiment.

FIG. 10 illustrates an augmented reality device with an array of small inclined mirrors 58 on thin transparent glasses 64 and with two light-field projector engines 62.

The inclined mirrors 59 (FIG. 13) and 58 are small-diameter partially or totally reflective mirrors (sub-mirror), respectively, arranged in an array which reflects pinhole-aperture light-fields in the locations of their virtual pinholes. The diameter of the inclined mirrors is preferably between 250 and 2000 micrometers. The real world 60 is an actual world. The light-field projector engine 62 is a projector which produces a light-field with finite aperture stop by means of temporal multiplexing of plurality of light-fields with almost zero diameters of their aperture stops. The glasses 64 are any transparent or partly transparent glasses or, in general, a solid transparent box or monolith of transparent material.

(FIG. 2) The always-in-focus retinal image 66 is an image of a virtual scene as projected by the pinhole-aperture light-field 16 on the retina 24. Another always-in-focus retinal image 68 is an image of a virtual scene as projected by the pinhole-aperture light-field 18 on the retina 24. Note the mutual shift of the images of the distant object 12 and the near object 14 on the images 66 and 68. The retinal image 70 is an image composed from two pinhole-aperture light-fields 16 and 18 when an eye 132 is focused on the distant object 12. The retinal image 72 is an image composed from two pinhole-aperture light-fields 16 and 18 when an eye 132 is focused between the distant object 12 and the near object 14. The retinal image 74 is an image composed from two pinhole-aperture light-fields 16 and 18 when an eye 132 is focused on the near object 14.

The retinal image 76 (see FIG. 3*a*) is an image projected with a light-field 26 composed of nine pinhole-aperture light-fields when an eye 132 is focused on the distant object 12. The point-light array 28 is in this case a rectangular two-dimensional array of three times three point-lights. The retinal image 78 (see FIG. 3*b*) is an image projected with a light-field 26 composed of the nine pinhole-aperture light-fields when an eye 132 is focused between the distant object 12 and the near object 14. The retinal image 80 (see FIG. 3*c*) is an image projected with a light-field 26 composed of nine pinhole-aperture light-fields when an eye 132 is focused on the near object 14.

The retinal image 82 (see FIG. 3*d*) is an image projected with a light-field 26 composed of hundred pinhole-aperture light-fields when an eye 132 is focused on the distant object 12. Here the point-light array 28 has ten times ten point-lights arranged in a rectangular two-dimensional array. The retinal image 84 (see FIG. 3*e*) is an image projected with a light-field composed of hundred pinhole-aperture light-fields when an eye 132 is focused between the objects 12 and 14. The retinal image 86 (see FIG. 3*e*) is an image projected with a light-field 26 composed of hundred pinhole-aperture light-fields when an eye 132 is focused on the near object 14.

The exemplar retinal images 82, 84 and 86 illustrate that if a large number of different pinhole-aperture light-fields is projected in a fast enough sequence, it is perceived by a viewer as a wide-aperture light-field 26 which creates smooth image blur on the retina 24 which is dependent on the focal length of an eye 132. The display control electronics 88 (see FIG. 4*c*) is a circuit which produces, formats and exports signal which creates an image on SLM 30. The illumination control electronics 90 is a circuit which produces, formats and exports signal which powers specific point-lights in the point-light array 28 in a specific time dependent fashion. The synchronization 92 is a communication between display and point-light control electronics 88 and 90 which controls which image component is illuminated on SLM 30 by which specific point-light. The image signal 94 is a conditioned electronic signal which creates sequence of image components on SLM 30. The illumination signal 96 is a conditioned electronic signal which causes the sequence of light emissions from point-lights in the point-light array 28.

The active point-light 98 is a point-light which emits light in the actual illumination step (see FIG. 7*a*) or sequence (see FIG. 8). The inactive point-light 100 is a point-light which does not emit light in the actual step (FIG. 7) or sequence (FIG. 8). The sequence of image components 102 is a temporal sequence of images which are displayed one after another on SLM 30. The illumination on/off 104 is a time dependent signal which determines an average intensity of illumination of SLM 30 from a point-light in the point-light array 28. The position of an active point-light 106 is a diagram of illumination sequence which shows position of an active point-light 98 in the point-light array 28 in an actual image frame. The image frame 108 is a time period during which one point-light illuminates one image component with a specific average light intensity. The image component 110 is an image which is displayed on SLM 30 and which carries at least part of an information that composes the wide-aperture light-field 26. Another image component 112 is an image which carries another part of an information that composes the wide-aperture light-field 26. The illumination step 114 is a part of the signal which control light emission of an active point-light 98 in order to determine its average illumination intensity. Another illumination step 114 is another part of signal which controls light emission of another active point-light 98 in another frame. The example of an image component sequence 118 is a sequence of images which represent examples of image components displayed on SLM 30. Note the mutual (and exaggerated) shifts of objects in the displayed image components 120, 122, 124 and 126 and their correlation with the position of an active point-light 98 in an actual frame. The displayed image component 120, 122, 124, or 126 is an example of an image that is displayed in an image frame such as 108 on SLM 30. The image sequence 128 is an illumination and projection sequence which composes a part of the light-field 26. Another image sequence 130 an optional complementary or redundant illumination and projection sequence which completes or densifies the projected light-field 26. The eye 132 is any human or animal eye.

Figure 11A:
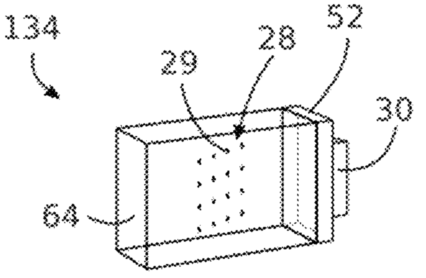
FIG. 11*a* represents the light-field projector, according to yet another embodiment.
Figure 11B:
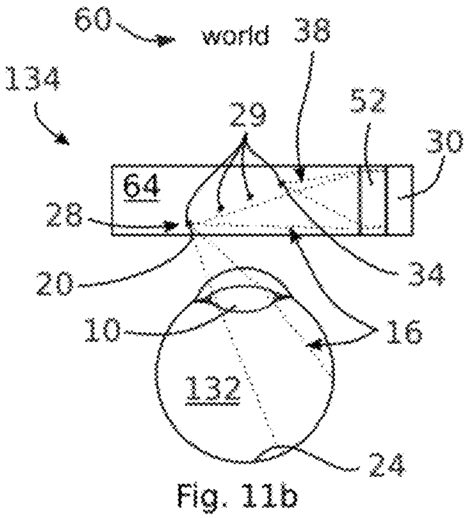
FIG. 11*b* shows a top view of the light-field projector of FIG. 11*a*.

FIG. 11*a* represents an alternative embodiment of the light-field projector configured as a small transparent see-through box 134 with embedded elements of the light-field projector. FIG. 11*b* shows a top or side view of the light-field projector of FIG. 11*a*, configured as a small see-through box 134 with embedded components of the light-field projector and with an example of a radial cone of a pinhole-aperture light-field 38 from a single point-light source inside one of the elements 29 passing through a lens 52 to the SLM 30 and envelope of the pinhole-aperture light-field 16 modulated by reflection of pinhole-aperture light-field 38 from SLM 30 through the lens 52 to another element 29 where the pinhole-aperture light-field 16 has an apex and reflects at least partly towards the eye retina 24.

Figure 11C:
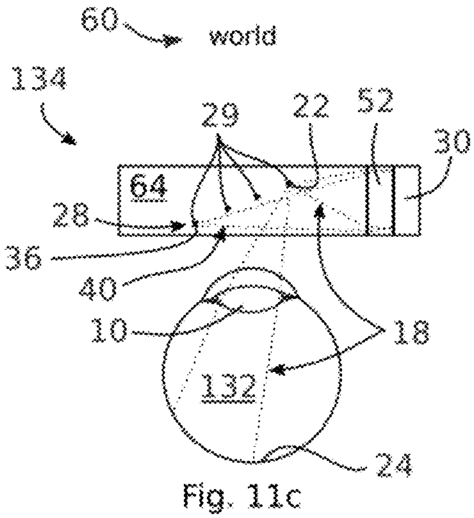
FIG. 11*c* shows a top view of the light-field projector, according to another embodiment.

FIG. 11*c* shows a top or side view of yet another embodiment of the light-field projector, configured as a small see-through box 134 with embedded components of the light-field projector and with an example of pinhole-aperture light-field 40 from a single light-source inside one of the elements 29 passing through a lens 52 to the SLM 30 and envelope of the pinhole-aperture light-field 18 modulated by reflection from SLM 30 through the lens 52 to another element 29 where the pinhole-aperture light-field 18 has an apex and reflects at least partly towards the eye retina 24.

Figure 11D:
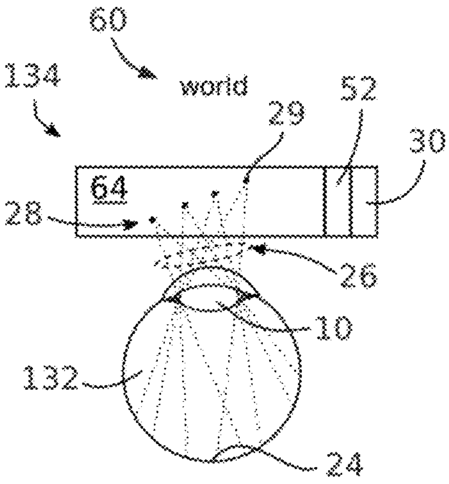
FIG. 11*d* shows a top view of the light-field projector, according to another embodiment.

FIG. 11*d* shows a top or side view of yet another embodiment of the light-field projector, configured as a small see-through box 134 with embedded components of the light-field projector and with an example of composed light-field 26 entering the eye 132 through the pupil 10 and reaching eye retina 24.

Figure 11E:
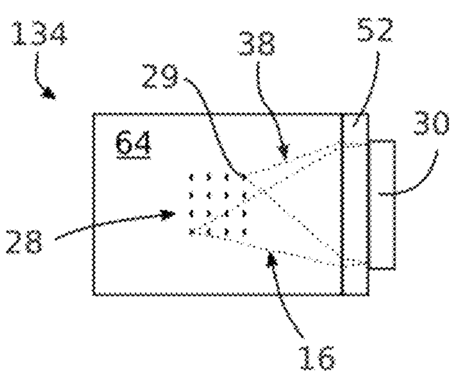

FIG. 11*e* shows a front or rear view of yet another embodiment of the light-field projector, configured as a small see-through box 134 with embedded components of the light-field projector and with an example of light path 38 from a single light-source inside one of the elements 29 through lens 52 to the SLM 30 and path of the modulated pinhole-aperture light-field 18 from SLM 30 through the lens 52 to another element 29.

The see-through box with embedded components of light-field projector 134 is an essential part of alternative embodiments of transparent see-through device that is suitable for mixing the artificially projected light-field with the natural light-field that enters an eye pupil 10 from surrounding natural world.

FIG. 12*a* is an alternative embodiment of the light-field projector configured as a small see-through box 134 with embedded components of the light-field projector which perform sequential spatial light modulation by retro-reflection caused by the combination of a layer system 136 and the SLM 30.

FIG. 12*b* shows a top or side view of yet another embodiment of the light-field projector, configured as a small see-through box 134 with embedded components of the light-field projector and with an example of a radial pinhole-aperture light-field 38 that is modulated and retro-reflected by combination of layer system 136 and SLM 30 as a pinhole-aperture light-field 16 back to the active element 29 which reflects the pinhole-aperture light-field 16 to the eye pupil 10 and to the eye retina 24.

FIG. 12*c* shows a top or side view of yet another embodiment of the light-field projector, configured as a small see-through box 134 with embedded components of the light-field projector and with an example of another radial cone of pinhole-aperture light-field 40 that is modulated and retro-reflected by combination of layer system 136 and SLM 30 as pinhole-aperture light-field 18 back to the active element 29 which reflects the pinhole-aperture light-field 18 to the eye pupil 10 and to the eye retina 24.

FIG. 12*d* shows a top or side view of yet another embodiment of the light-field projector, configured as a small see-through box 134 with embedded components of the light-field projector and with plurality of radial pinhole-aperture light-fields which, in sequence, compose the light-field 26.

FIG. 12*e* shows yet another embodiment of the light-field projector, configured as a small see-through box 134 with embedded elements 29 inside the transparent box 64 and with layer system 136 and the SLM 30 outside the box 64.

FIG. 12*f* shows a top or side view of yet another embodiment of the light-field projector, configured as a small see-through box 134 with embedded elements 29 inside the transparent box 64, with layer system 136 and the SLM 30 outside the box 64 and with plurality of radial pinhole-aperture light-fields which, in sequence, compose the light-field 26.

FIG. 12*g* shows a top or side view of another alternative embodiment of the light-field projector configured as a small see-through box 134 with embedded elements 29 inside the transparent box 64, with layer system 136 and the SLM 30 outside the box 64 and with plurality of radial pinhole-aperture light-fields which, in sequence, compose the light-field 26.

The layer system 136 which, in combination with a reflective SLM 30, constitutes a retroreflective display can comprise, for instance, a microlens array or a grid of parallel and perpendicular mirrors, which are placed in the proximity to the reflective surface of conventional reflective displays such as FLCOS or DMD, respectively. The combination of the layer system 136 and the reflective SLM 30 functions as a retro-reflective display.

FIG. 13*a* represents an idealized element 29 with point-light source 34 and a partly reflecting and partly transparent mirror 59 and with out-of-scale illustrated SLM 30 with layer system 136 which together cause retroreflection of the incident light 38 from SLM which creates modulated pinhole-aperture light-field 16 with cone apex in the initial light source 34 beside which the pinhole-aperture light-field 16 partly reflects towards an eye.

Figure 13B:
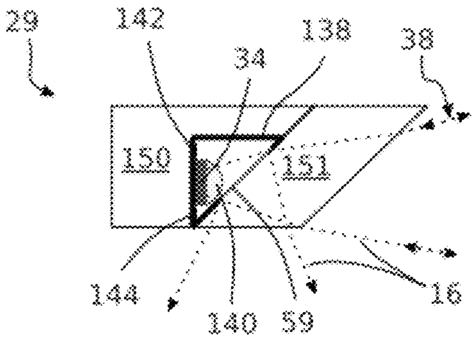
FIG. 13*b* represents the element, according to another embodiment.

FIG. 13*b* shows a preferred embodiment of the element 29 with point-light source 34 in transparent holder 150 (first transparent holder) and a partly reflecting and partly transparent mirror 59 on a transparent holder 151 (second transparent holder), with light absorbing coating 138, light forming optics 140 and transparent powering wires 142 and 144.

Figure 13C:
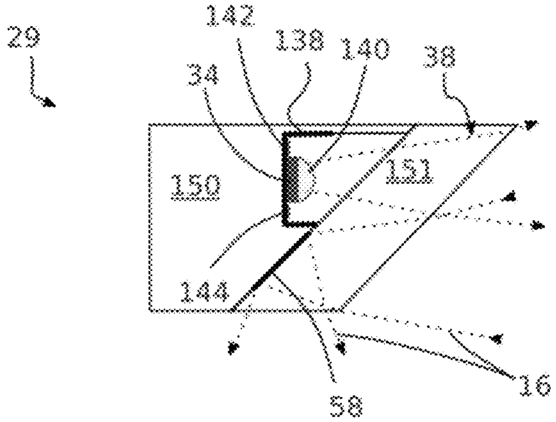
FIG. 13*c* represents the element, according to yet another embodiment.

FIG. 13*c* shows another embodiment of the element 29 with point-light source 34 in transparent holder 150 and a fully reflecting mirror 58 on a transparent holder 151 or 150, with light absorbing coating 138, light forming optics 140 and transparent powering wires 142 and 144.

Figure 13D:
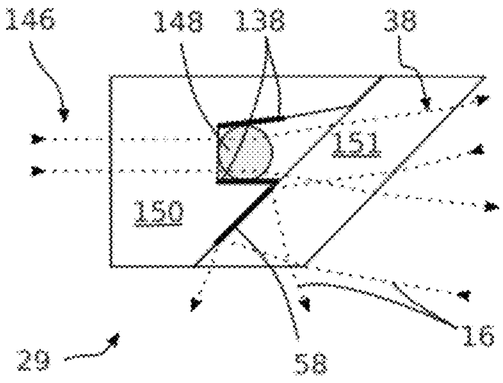
FIG. 13*d* represents the element, according to another embodiment.

FIG. 13*d* shows another embodiment of the element 29 with light diffusing element 148 inside transparent holder 150 where it is illuminated by beam 146, with a fully reflecting mirror 58 on a transparent holder 151 or 150 and with light absorbing coating 138.

Figure 13E:
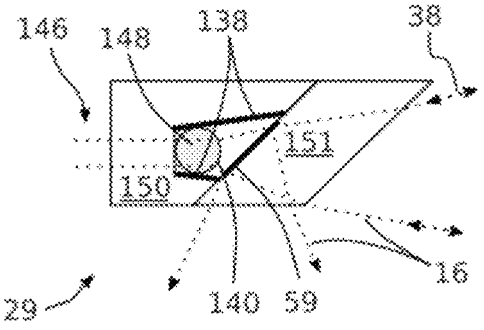
FIG. 13*e* represents the element, according to another embodiment.

FIG. 13*e* shows another embodiment of the element 29 with light diffusing element 148 inside transparent holder 150 where it is illuminated by beam 146, with partly reflecting and partly transparent mirror 59 on a transparent holder 151 and with light absorbing coating 138.

Figure 13F:
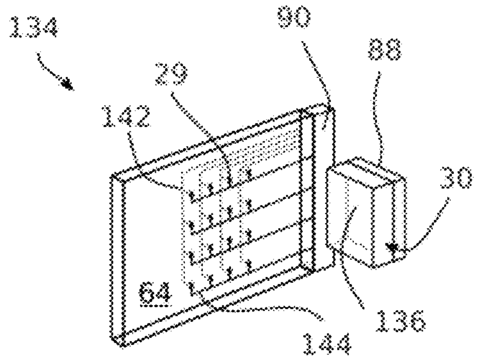
FIG. 13*f* represents a see-through box of the light-field projector, according to an embodiment.

FIG. 13*f* illustrates an example of wiring of transparent electrodes 142 and 144 from illumination control electronics 90 to active elements 29 and an exemplar location of display control electronics 88.

Figure 13G:
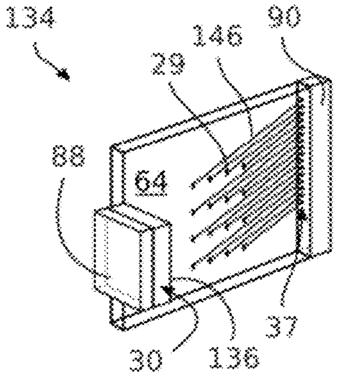
FIG. 13*g* represents a see-through box of the light-field projector, according to another embodiment.

FIG. 13*g* illustrates an example of external illumination of elements 29 by external sources of collimated light 37.

The light absorbing coating 138 is any coating which prevents the light rays from a light-source 34 to propagate to undesired directions such as directly to the eye pupil 10. The optical element 140 is any element which shapes and homogenizes the light emitted from the light source 34 into a cone of uniform radial light such as pinhole-aperture light-field 38. The optical element 140 comprises, for instance, a light diffusing layer such as a translucent coating on the surface of the light source 34 and a pinhole filter in the vicinity of the diffusing layer or a convex lens which project the diffused (homogenized) light 38 with small diameter aperture stop and illuminates uniformly the SLM 30. The optical element 140 can comprise also a hollow box which is coated with light reflecting and diffusing layer on the inner walls and has an opening to emit the homogenized radial light cone such as pinhole-aperture light-field 38 of the light source 34 that is inside the hollow box and is coated with translucent diffusing layer or is oriented in such way that it does not emit light directly from the hollow box but only after reflection from the light diffusing coating.

Figure 14A:
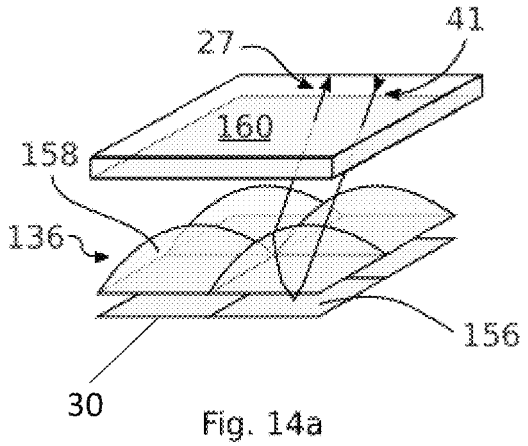
FIG. 14*a* shows a retroreflective display of the light-field projector, according to an embodiment.
Figure 14B:
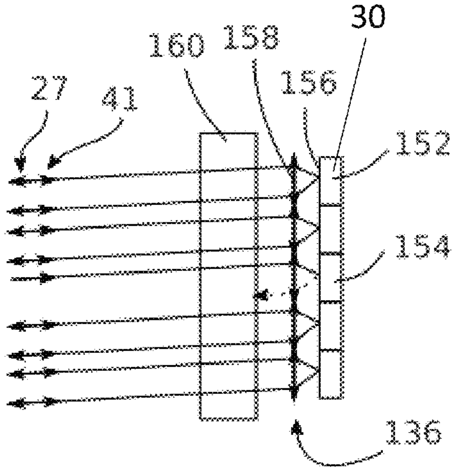
FIG. 14*b* shows the retroreflective display, according to another embodiment.

FIG. 14*a* shows a perspective view and FIG. 14*b* shows a side or top view of a layer system 136 functioning as a retro-reflective display when in combination with the spatial light modulator 30, according to an embodiment. Here, the spatial light modulator 30 comprises a polarization rotating layer 156 such as that of FLCOS, and the layer system 136 comprises a polarization filter 160 and a microlens array with lenses 158 with focal length equal to the smallest distance between the lens and the reflecting surface 156. FIG. 14*b* shows the bright pixel 152 and the dark pixels 154 of the polarization rotating layer 156 (see below).

Figure 14C:
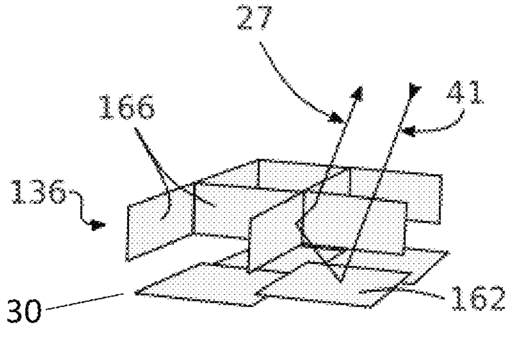
FIG. 14*c* shows the retroreflective display, according to yet another embodiment.
Figure 14D:
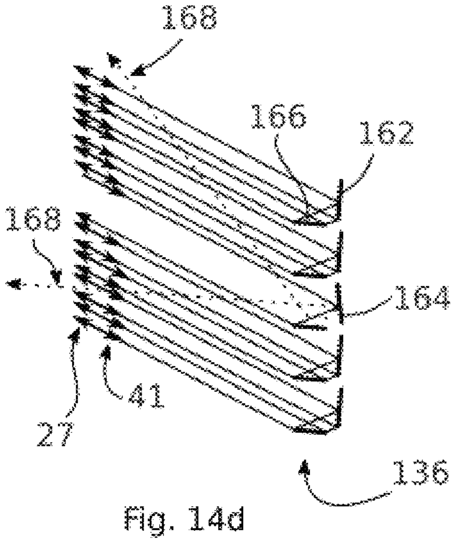
FIG. 14*d* shows the retroreflective display, according to yet another embodiment.

FIG. 14*c* shows a perspective view and FIG. 14*d* shows a side or top view of the layer system 136 to be used in combination with the reflective SLM 30 such as to function as a retroreflective display, according to another embodiment. Here, the reflective SLM 30 comprises tilting mirrors 162 such as those of DMD and the layer system 136 comprises a grid of fixed reflective surfaces 166 that are parallel or perpendicular to each other and perpendicular to mirrors 162 in the position corresponding to an active bright pixel. The mirrors of bright pixels and the mirrors 166 constitute cube corner retroreflectors.

The transparent holders 150 and 151 of the light source 34 and the mirror 58 or partly-transparent mirror 59 are, in general, any transparent objects which physically hold the said objects 34, 58, 59 in the desired position and orientation. It can be, for instance, specifically shaped pieces of silicon or acrylic glass.

The bright pixel 152 of a reflective SLM 30 is a pixel which reflects an incident ray 41 in such way that the reflected ray becomes intended part of modulated pinhole-aperture light-field such as 16 or 18 and finally of the composed light-field 26. The dark pixel 154 of a reflective SLM is a pixel which does not reflect an incident ray 41 in such way that the reflected ray becomes intended part of modulated pinhole-aperture light-field such as 16 or 18 and finally of the composed light-field 26. The ray reflected from the dark pixel 154 is absorbed outside the eye retina 24. The reflective surface 156 of the SLM is the mirror part with image pattern of FLCOS, DMD, or other deflective display. Microlens 158 as a microscopic lens which is a part of a microlens array that has ideally the same periodicity as the pixels of SLM 30. The microlens 158 has focal length ideally identical to the smallest distance between the microlens center and the reflective surface of SLM 30. Polarization filter 160 is a filter which absorbs light with specific orientation of polarization and transmits light with polarization that is parallel to that which is absorbed. Micromirror 162 is a mechanically moving (tilting) mirror of DMD SLM 30 which has orientation that reflects incident light rays to the direction in which they become intended part of the light-field 26. Micromirror 164 is a mechanically moving (tilting) mirror of DMD SLM 30 which has orientation that reflects incident light rays to the direction in which they do not become part of the light-field 26. The rays 168 are light rays that are diverted to directions in which they do not become parts of the light-field 26.

Figure 15A:
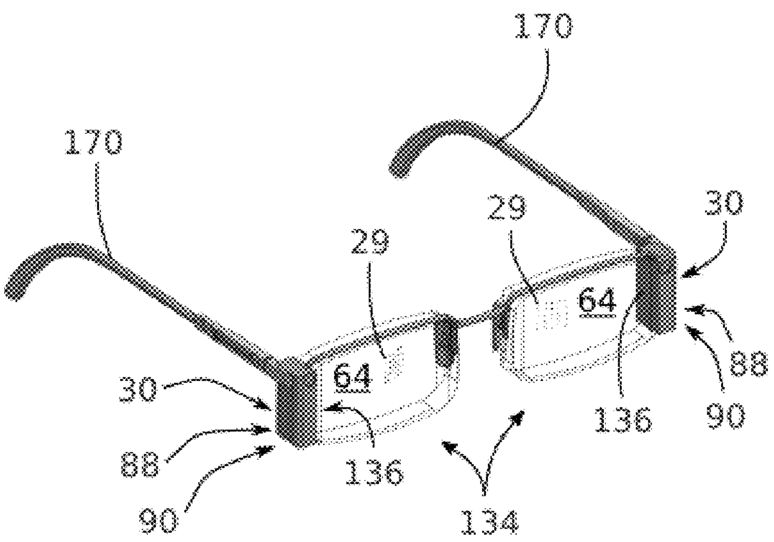
FIG. 15*a* shows a front view of an augmented reality device, according to another embodiment.

FIG. 15*a* shows a front view on an alternative embodiment of an augmented or mixed reality device comprising see-through box 134 with embedded components of a light-field projector with SLMs located on the outer sides of the transparent boxes.

Figure 15B:
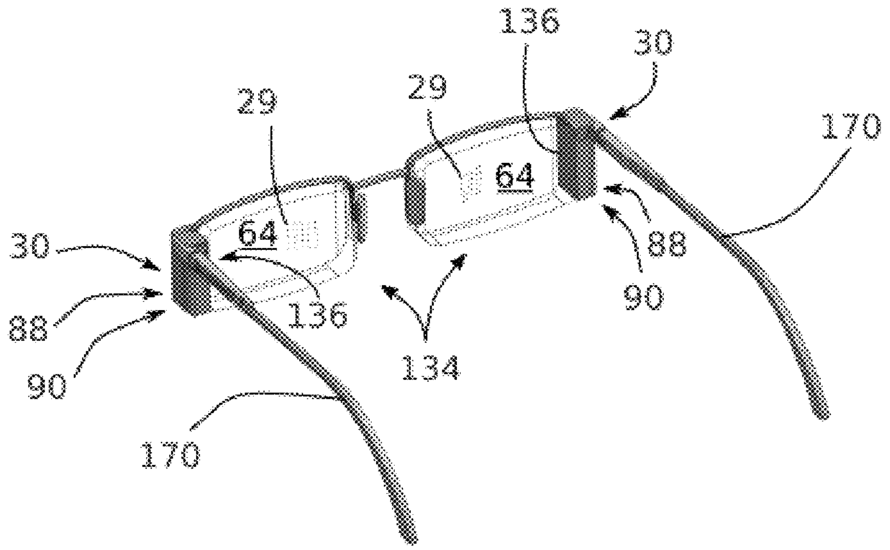
FIG. 15*b* shows a rear view of the augmented reality device, according to another embodiment.

FIG. 15*b* shows a rear view on an alternative embodiment of an augmented or mixed reality device comprising see-through box 134 with embedded components of a light-field projector with SLMs located on the outer sides of the transparent boxes.

Figure 15C:
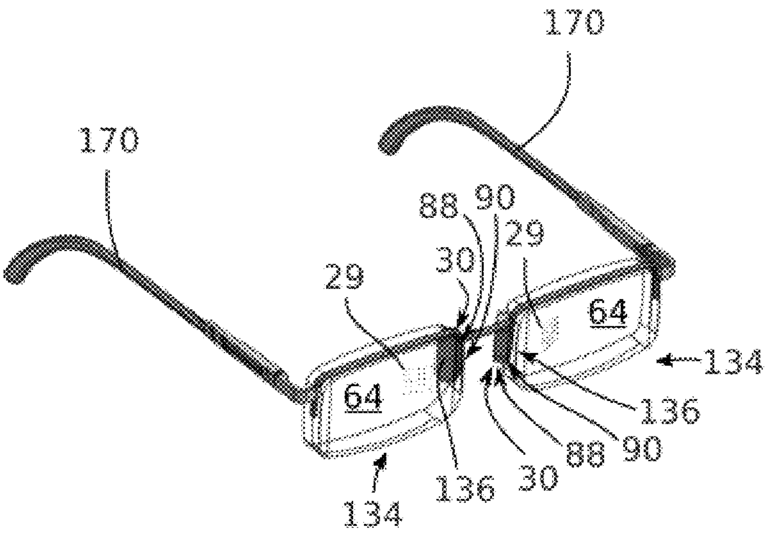
FIG. 15*c* shows a front view of the augmented reality device, according to another embodiment.

FIG. 15*c* shows a front view on an alternative embodiment of an augmented or mixed reality device comprising see-through box 134 with embedded components of a light-field projector with SLMs located on the inner sides of the transparent boxes.

Figure 15D:
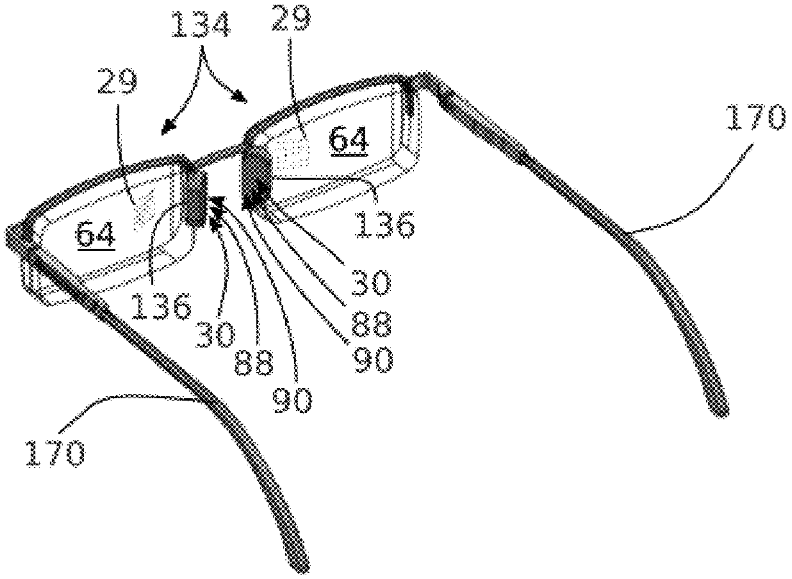
FIG. 15*d* shows a rear view of the augmented reality device, according to another embodiment.

FIG. 15*d* shows a rear view on an alternative embodiment of an augmented or mixed reality device comprising see-through box 134 with embedded components of a light-field projector with SLMs located on the inner sides of the transparent boxes.

The arms of the glasses 170 are mechanical structures which are supposed to rest over the human ears and can contain electronics, battery, or other functional components.

Description of Overall Structure of Invention

The overall structure of the light-field projector disclosed in this invention comprises two essential components: an illumination source such as the two-dimensional point-light array 28 and a fast reflective SLM 30. The control driver 88 and 90 of the SLM 30 and of the point-light array 28 are synchronized 92 in order to modulate a specific incident light-field such as 38 or 40 with corresponding image such as 66, 68, 120, 122, 124 or 126 on the SLM 30. Each combination of a point-light in a point-light array 28 and the image displayed on the SLM 30 corresponds to at least partial information of the wide-aperture light-field 26. For instance, when the SLM 30 is illuminated with the incident light-field 38 produced with the point-light 34, the projector creates the pinhole-aperture light-field 16. The image on the SLM 30 for this point-light 34 must contain at least part of the image information (such as a bit-plane of a certain color) of an artificial scene as it is supposed to be seen through the virtual pinhole 20. The guiding optics 32 serves to guide the incident light from the point-light array 28 to the SLM 30 and after the reflection from the SLM 30 to the output in the form of the wide-aperture light-field 26.

All particular embodiments of this invention contain these basic components in alternative configurations and with alternative realization of the guiding optics 32. For instance the guiding optics can contain optional lenses and filters such as shown in FIG. 6 or the point-light array 28 can be inclined (or three-dimensional) in respect to the optical axis of the projector in order to create the arrangement of virtual pinholes such as 20 and 22 also inclined (or three-dimensional) in respect to the optical axis of the projector.

Alternative embodiments of the disclosed invention are configured to combine the artificially projected light-field 26 with the natural light-field produced by the real world 60. The smallest form-factor embodiment of the see-through light-field projector uses a retroreflective display comprising SLM 30 and a layer system 136 which together allow that the locations point-light sources 28 and filtering mirrors 58 coincide with each other.

Relationship Between the Parts of the Invention

An eye pupil 10 of an eye 132 (see FIG. 1) receives a part of the wide-aperture light-field 26 which is composed of plurality of pinhole-aperture light-fields including the pinhole-aperture light-field 16 and another pinhole-aperture light-field 18. The exit pupil given by the aperture stop of the wide-aperture light-field 26 is larger than the pupil 10 in order to project at least part of the light-field 26 into the pupil 10 even in the case the pupil 10 is moving relatively to the projector. The wide-aperture light-field 26 carries the images of plurality of objects, such as the distant object 12 and the near object 14, as seen through the plurality of virtual pinholes such as 20 and 22. The virtual pinholes 20 and 22 are located in the vicinity of the pupil 10 and have as small diameter as technically possible. The retina 24 receives images of an artificial scene with, for instance, distant object 12 and near object 14 and senses image blur which is dependent on the distance of the observed objects and the focal length of an eye 132 as illustrated in FIGS. 2 and 3. The light-field projector engine 62 (see FIG. 10) comprises a two-dimensional point-light array 28 which comprises plurality of point-lights including the point-light 34 and another point-light 36 which are sources of incident light-fields including 38 and 40. A plurality of point-lights such as 34 and 36 illuminate one after another in a fast sequence the reflective SLM 30 through a guiding optics 32. The optics 32 comprises optional collimating lens 42 located between the point-light array 28 and the SLM 30, an optional total internal reflection prism 44 which separates the desired light-field modulated by the SLM 30 from other light-field components. The optional optical elements such as the lenses 52 and 56 serve to guide the light-field reflected from the SLM 30 through the Fourier filter 54 before it enters the eye-piece 46. The Fourier filter 54 removes, for example, diffraction components from the light-field after the reflection from the SLM 30.

The SLM 30 and the active point-lights 98 in the point-light array 28 are synchronized via synchronization signal 92 between drivers 88 and 90 as illustrated on an example with four point-lights in the FIG. 7. The sequences 128 and 130 of SLM 30 illumination with the point-light array 28 are preferably changed in each subsequent sequence as illustrated on an example in FIG. 8 in order to maximally mix and densify the information in the wide-aperture light-field 26. The mixing is important because only part of the wide-aperture light-field enters the pupil 10 in each instant. The image displayed on the SLM 30 for each point-light illumination can be a one color bit-plane of the image as suggested in FIGS. 7 and 8, but it can be another partial information which the SLM 30 is able to display in a fast sequence. In case of binary displays such as the DMD (digital micromirror device), the light-field can be composed of binary monochromatic images of the same or similar intensity such as the images 120, 122, 124 and 126 in the FIG. 7 or binary halftone images where the partial gray scale information is determined by the density of bright pixels (see FIG. 7*b*). Overlapping of the plurality of light-fields produced with binary monochromatic images, especially the halftone images (see FIG. 7*b*), creates an illusion of a color and intensity scale. Here, the expressions "binary monochromatic images" and "halftone images" should be understood as "monochrome dithered image", for example a grayscale image represented in 1 bit black-and-white space with dithering (see https://en.wikipedia.org/wiki/Dither). The guiding optics 32 can be set so that the image plane of the spatial light modulator 30, as seen through the optical system 32 from the position of the pupil, is outside the viewer's accommodation range, for example in front of but less than 10 cm from the pupil 10 or in a large distance behind the pupil 10. The reason for this setting is that the viewer's eye 132 cannot focus on the image plane of the SLM 30. Each pixel of each image component in this arrangement is slightly blurred due to imperfections of the optics 32. The resulting composed image then feels naturally smooth.

Description of how the Invention Operates/Functions

FIG. 1 illustrates the underlying principle of the near-eye light-field projector presented in this disclosure. The mechanism which provides viewer's perception of realistic finite depth of field and correct eye accommodation is based on the approximation of the full light-field, which is supposed to enter an eye pupil 10 from a virtual 3D scene with objects such as 12 and 14, by composition of plurality of pinhole-aperture light-fields such as 16 and 18. Each of the pinhole-aperture light-fields 16 and 18 enters the pupil 10 through a different virtual pinhole 20 and 22. The virtual pinholes 20, 22 and another must be located near the eye pupil 10 so, that the light-field 26 which passes through them enters at least partly and at least temporarily the eye pupil 10.

Each pinhole-aperture light-field, such as 16 and 18, creates on the viewer's retina 24 an always-in-focus image such as 66 and 68 in FIGS. 2*a* and 2*b*. The images such as 66 and 68 correspond to the images of a virtual 3D scene with objects 12 and 14 as seen from the viewpoints of the corresponding virtual pinholes 20 and 22. The images 66 and 68 are therefore not identical. Particularly, the positions of the images of the objects 12 and 14, which are in different distances from the eye pupil 10, are mutually shifted. This mutual shift, indicated by the dimension d in 68, depends on the distances of the virtual objects 12 and 14 from the virtual pinholes 20 and 22 and on the mutual distance of the pinholes 20 and 22. In addition, and most importantly, the overall position of the images 66 and 68 on the retina 24 depends on the focal length of an eye 132. For instance, when an eye is focused on the distance of the distant object 12 (the house), this object will be projected on the same place on retina 24 through both pinholes 20 and 22 while the two images of the near object 14 (the ant) in another distance will be shifted by d. When the pinhole-aperture light-fields 16 and 18 enter the pupil 10 simultaneously or in a fast sequence, the resulting image on retina 24 will contain both images 66 and 68. In this case, when the eye 132 is focused on the distant object 12 (the house) the images of this object 12 on retina 24 will overlap and appear only once while the image of the closer object 14 (the ant) will appear double as illustrated on the image 70 in FIG. 2*c*. Oppositely, when the eye 132 is focused on the distance of the near object 14 (the ant) the resulting image 74 will contain one image of the ant 14 and doubled image of the distant house 12 as seen in FIG. 2*e*. Any other focus will create an image, such as 72, with both objects doubled as illustrated in FIG. 2*d*.

When plurality of pinhole-aperture light-fields is summed, the plurality of their individual images such as 66, 68, 120, 122, 124, 126 will merge on the retina 24. The resulting image will therefore depend on the focal length on an eye 132, distances of the objects from the virtual pinholes, and on the number and of the virtual pinholes and their distances. An example of resulting image 76 with nine pinholes arranged in a rectangular array of three times three pinholes is seen in FIG. 3*a* when an eye 132 is focused on the distant object 12, an image 78 in FIG. 3*b* when an eye 132 is focused between the distant object 12 and the near object 14, and an image 80 in FIG. 3*c* when an eye 132 is focused on the near object 14.

Finally, when the light-field 26 is composed of a high number (such as hundred) of different pinhole-aperture light-fields, the resulting image on retina will contain almost natural blur like seen in an image 82 in FIG. 3*d* (focus on the distant object 12), an image 84 in FIG. 3*e* (focus between the distant 12 and the near object 14), and an image 86 in FIG. 3*f* (focus on the near object 14). This principle allows that an eye 132 can focus on any object in any distance inside the accommodation range of the eye 132, which results in overlapping of their images on retina 24 which makes them appear sharp, while it blurs the composed images of objects in another distances.

In the schematic diagram of the light-field projector device in FIGS. 4*a*-4*c*, the plurality of the pinhole-aperture light-fields such as 16 and 18 is temporally multiplexed and composes a wide-aperture light-field 26. The light-field 26 reconstructs partly a full light-field that is supposed to enter the viewer's eye pupil 10. In the simplest schematic embodiment of FIGS. 4*a*-4*c* the device comprises two-dimensional point-light array 28 (which is viewed from a side in FIGS. 4*a*-4*c*), fast reflective SLM 30 and light guiding optics 32. Each step of the projection sequence consists of a defined flash illumination of the SLM 30 with selected point-light such as 34 or 36 in the point-light array 28 through the optics 32 which guides the incident radial point-light fields such as 38 and 40. The SLM 30 modulates the amplitude (and optionally also phase) of the incident light-fields by a selective reflection. For each illumination step with a selected point-light such as 34 and 36, the reflective pattern corresponds to a part of an image of a virtual scene as seen through the corresponding virtual pinholes 20 and 22. The optics 32 guides the light-fields such as 38 and 40 to reflect from the SLM 30 and to create (or project) the amplitude modulated light-field cones 16 and 18. The light-field 16 which propagates through the virtual pinhole 20 is ideally identical to at least part of a pinhole-aperture light-field information from a virtual 3D scene (resulting in a near-eye projected image). The image on SLM 30 is controlled by the control electronics 88 via image signal 94 which is synchronized via 92 with illumination control circuit 90 which controls the illumination sequence of point-light array 28 via the signal 96.

A more particular preferred embodiment of the light-field projector disclosed here is shown in FIG. 5*a*. It contains a two-dimensional point-light array 28 (seen from a side in FIG. 5*a*), optionally the collimating lens 42, optionally a total internal reflection prism 44, a fast reflective SLM 30, and an eyepiece optics such as a lens 46. Whole system projects sequentially light from the point-light array 28 through the optics 42, 44, 30, 46 where it is modulated by the SLM 30, to the virtual pinholes such as 20 and 22.

FIG. 5*b* illustrates how a light-field from a virtual point object 48 in certain virtual distance is created. The light-field from the virtual point object 48 is a sum of its corresponding rays in the plurality of pinhole-aperture light-fields created one after another during a projection sequence. For each active point-light from the array 28 a different image is displayed on the reflective SLM 30. The virtual point object 48 is sequentially displayed on the SLM 30 at locations of the source images of the virtual point 50. As a result, the eye retina 24 receives in a fast sequence plurality of light rays from the virtual point object 48. The position of the image of the virtual point object 48 on the retina 24 depends on the focal length of an eye 132. If the eye 132 is focused on the distance of the virtual point object 48, the rays overlap on the retina 24 at one spot, if the eye 132 is focused on another distance, the image on retina will contain the image of virtual point object 48 multiple times next to each other which makes it appear blurred. The number of images that are merged in this process depends on the number of pinhole-aperture light-fields which enter the pupil 10. The higher the number the more natural the image blur appears.

FIG. 7 illustrates the process of the sequential illumination of the SLM 30 with the point-light array 28. The example in FIG. 7 contains only four point-lights and four exemplar image components but an actual point-light array 28 can contain thousands of point-lights and the images thousands of components. The sequence of displayed image components 102 illustrates that the SLM 30 displays frames such as 108 during which the SLM 30 displays an image component such as 110 or 112 which are illuminated with corresponding active point-light 98 with the illumination given by a time dependent function such as 114 or 116. The sequence of exemplar image components 118 shows images 120, 122, 124 and 126 which contain mutually shifted objects according to their virtual distances form an eye pupil 10, the properties of the guiding optics 32, and the position of an active point-light 98 in the point-light array 28. The sequence of active point-lights 106 and the illumination sequence 104 together with image sequence 118 can be in principle arbitrary depending on the process of decomposition of a virtual scene into image components.

An actual illumination and display sequence is however ideally optimized for a specific purpose, and contains all components of a final image with their correct partial intensities. The sequence can be composed from binary images corresponding to all gray scale bit-planes from Most Significant Bit (MSB) plane to the Least Significant Bit (LSB) plane which have the color of the corresponding active point-light 98 in the array 28. The colors of individual point-lights can be different. The partial intensity of a bit plane in the final image is controlled by the relative length of exposure in respect to the length of a bit-plane frame 108. The intensity of illumination can be realized by the length of a pulse as in the sequence 104, but also by pulse width modulation, with continuously controlled intensity, or other means. The position of the active point-light, which is, for instance, a Light Emitting Diode (LED) with a pinhole mask, is illustrated by the sequence 106. The empty circles 98 illustrate that an LED emits light. The full circles 100 mean that the LED is off. In a realistic application, where it is not guaranteed that a light-field corresponding to a specific image component enters the viewer's pupil, it is desirable that each image component is projected several times, each time with a different point-light (according to which the image component must be modified). For example, in case of final image decomposed into individual bit-planes of different intensities and colors, each bit-plane (https://en.wikipedia.org/wiki/Bit_plane) should be ideally illuminated with all point-lights. This is however unrealistic in most situations and therefore the number of bit-plane repetitions for other point-lights must be optimized. A suitable approach which does not require management of image components with different significance (such as different brightness of bit-plane components) is the use of halftone binary images FIG. 7*b* where the gray scale is defined by density of bright pixels. All such image components have identical significance.

FIG. 8 illustrates how the illumination and display sequence can be shuffled during projection of one complete image. The example assumes a ten times ten rectangular array of point-lights 28 and an image which is decomposed into one or more 8-bit image components. The empty circles indicate active point-lights 98 which emit light one after another in the given sequence 128 or 130 in the order indicated by the adjacent numbers in FIG. 8. Each point-light can emit a different color. The key point is, that the resulting light-field 26 which is created with the stroboscopic point-light illumination of the SLM 30 contains as many pinhole-aperture light-fields as technically possible during the period of the viewer's vision latency. The complete image information per pinhole-aperture light-field means that all bit planes of all colors are illuminated with the one corresponding point-light. To achieve this, the illumination sequences must be repeated with predefined transformations of the illumination patterns such as that between sequences 128 and 130, until all bit planes are illuminated with all point-lights with corresponding intensities. In an actual implementation the number of bit-planes per point-light may be reduced according to specific limitations of individual cases for example due to a limited frame-rate, viewer's latency, size of the pupil aperture, type of images (monochrome, gray-scale, RGB etc.). Practical tests show, that the amount of projected information can be reduced as much as to one bit-plane per point-light with acceptable loss of resulting quality.

As already mentioned in another words above, the individual images displayed by the SLM 30 in each illumination step can be also binary monochromatic images, such as halftone images FIG. 7.*b* where the brightness is determined by the density of bright pixels, that are illuminated with different point-lights, with different colors but with the same or similar intensity. The resulting sum of the multiple halftone images FIG. 7.*b* that overlap on the retina 24 creates a scale of colors and brightness. The temporal multiplexing of binary images of the same intensity is convenient in the situation when the eye pupil 10 receives in each instant unspecified subset of the wide-aperture light-field 26.

In the alternative embodiment of the disclosed see-through mixed reality device in FIG. 11, the mixing of artificially projected light-field with the natural light from the real world is performed by means of sequential illumination of the reflective SLM 30 by point-light sources such as 34 that are part of the point-light source array 28 and, in the embodiment in FIG. 11, but also in FIG. 12, each point-light is embedded in an element 29. The SLM 30 in the embodiment in FIG. 11 is illuminated through the lens 52. When the incident pinhole-aperture light-field such as 38 is reflected from SLM 30, the reflected pinhole-aperture light-field 16 is modulated by the pattern on SLM 30 and propagates again, but in the opposite direction, through the lens 52 which concentrates the modulated pinhole-aperture light-field 16 to an apex, or in other words to a virtual pinhole such as 20, which, in the embodiment FIG. 11, is located at the position of a mirror 58 or 59 of an element 29. The mirror 58 or 59 reflects the modulated pinhole-aperture light-field 16 towards the eye pupil 10. The mirror 58 or 59 acts as a Fourier filter which filters our diffraction satellites that are present in the modulated light-field 16 due to interference of light reflected from the periodic pattern of small pitch pixels at the SLM 30. The source element 29 and the filtering element 29 are in general in different locations which correspond to images of each other in the optical system. The filtering mirror 58 or 59 of a filtering element 29 can be dislocated from the theoretically ideal position that is at the location of the image of the illuminating element 29, because the real light source element 29 does not have ideally zero aperture and the retroreflection in a real system is not ideal which causes that the first order image of the source (after modulation of its light by SLM 30) has non-zero size at the location of the filtering element 29.

Unique Features of Invention

The near-eye light-field projector engine 62 provides autonomous light-field 26 which is composed of temporally multiplexed sequence of always-in-focus light-fields. The projector does not require any information about the eye accommodation of a viewer in order to provide realistic monocular depth cues. Projection directly to an eye pupil 10 and its vicinity (in order to cover the region of the pupil motion) reduces—in contrast to large 3D displays—the amount of information that must be delivered to and projected from the projector. Beside the monocular perception of the image depth from an eye accommodation and an image blur due to the finite depth of field, a viewer senses distances of the observed objects from the small mutual displacements of near 14 and distant 12 objects when the pupil 10 moves. The optics of the projector 32 can be set so, that the projected objects have exact position in respect to the real world. The optics 32 and the projected light field 26 can be arranged to reduce or amplify the effect of the depth of field.

The fast sequential projection of the light-field components, especially when the components consist of monochromatic binary images of the same intensity, supports a realistic perception of moving objects. In conventional displays, each frame with a moving object contains usually its corresponding motion blur which improves the visual experience when a viewer observes the static background or static objects in the scene. A moving object is however perceived as blurred even when an eye tracks its motion. In the real world, the moving object whose position is tracked by a viewer's eye becomes sharp while the other objects, which move relatively to the tracked object, are perceived as having a motion blur. The light-field projector 62 projects light-field components in tens of times faster rate than conventional displays which means that an eye receives light-field components each almost without a motion blur while the motion blur experienced by the viewer is more realistic as it depends on which object is tracked by the viewer.

The light-field projector can be constructed from relatively low cost reliable mass produced components.

In combination with augmented reality glasses such as those in the alternative embodiments in FIG. 9 and FIG. 10, the light-field projector 62 can combine the light-field incoming from the real world 60 with the light-field 26 reflected from mirrors 58 (or delivered through another augmented reality optics), with correct monocular depth cues of all objects.

The range of distances which can be perceived in the light-field 26 is practically continuous and ranges from zero distance to infinity.

The monocular depth cues produced with the projector 62 can be combined with stereoscopic depth cues when each of the viewer's eyes receives corresponding light-field from a different projector 62 such as in the arrangement in FIG. 9. Correct monocular depth cues in a stereoscopic projector remove the so called vergence-accommodation conflict.

The composition of a final image from the plurality of image components causes that the composed image has a higher resolution than each of the image components.

The fact that the wide-aperture light-field 26 is composed of pinhole-aperture light fields allows to compensate imperfections of the optics 32 by digital processing of the input images. The digital compensation of optical errors may significantly reduce the price of optics.

The embodiments of the see-through projector with retroreflective displays can be used to construct compact and very small form-factor mixed reality glasses.

How to Make the Invention

The preferred embodiment of the invention disclosed here can be produced with a point-light array 28 made of plurality of light emitting diodes of multiple colors such as red, green and blue, which are covered with a mask containing an array of pinholes that can be produced by laser cutting, micromachining, or etching; or each diode can be coupled with an optical fiber whose output serves as a point-light. Numerous embodiments of the point-light array can exist including use of fiber optics splitters, moving diodes, moving mirrors etc.

The SLM 30 can be based on DMD (digital micromirror device) or FLCOS (Ferroelectric Liquid Crystal on Silicon), optionally in combination with a total internal reflection prism 44 or polarization prisms and conventional collimating lens 42 of appropriate focal length. The eye-piece 46 can be made of a single lens or mirror with relatively small focal length, both optionally in combination with digital compensation of spherical and chromatic aberration errors. An eye-piece 46 can be based on a more complex and optimized commercially produced wide angle eyepiece.

The optional filter optics contains at least one conventional lens 52 which creates Fourier plane of the incident light-field. The Fourier filter 54 with pinhole array can be made of optically non-transparent and non-translucent plate with laser cut, drilled or etched pinholes or other filtering pattern. The filter 54 can be alternatively arranged in a reflection mode, where the pinholes or other filtering pattern are substituted with micromirrors such as 58 in the embodiment in the FIG. 9, FIG. 10, FIG. 11, FIG. 12. and FIG. 15.

An array of elements 29 can be produced by conventional microtechnology lithography steps with directional dry or wet etching of the openings for the light sources in the transparent holders 150 and 151, and material deposition such as sputtering or evaporation of the light absorbing materials 138, mirrors 58 and 59 and transparent electrodes 142 and 144. The arrays of microlenses 158 are already being commercially produced with conventional microtechnology techniques. The grid of mirrors 166 can be produced by dry etching of trenches into a transparent substrate and subsequent chemical or physical deposition of reflective metal such as aluminium on the walls of the trenches and removing (polishing) of the deposited metal from other surfaces of the substrate.

Alternative Embodiments of Invention

FIG. 6 illustrates more particular alternative embodiment of the light-field projector disclosed in this invention. The reflective SLM 30 such as DMD or FLCOS have typical pixel pitch around 10 μm which results in an appearance of diffraction components in the reflected light-field. The embodiment in FIG. 6 therefore contains additional optics 52, which creates an image plane of the point-light array 28 at the location of the Fourier filter 54, and an eyepiece optics such as 56 and 46. The Fourier filter 54 transmits the modulated pinhole-aperture light-fields and blocks all diffraction components of the light-field that were created between the point-light array 28 and the Fourier filter 54. In practice, the Fourier filter 54 is a fixed pinhole array which is a scaled image of the point-light array 28. It is preferable that the pinholes on the filter 52 are large enough to minimize diffraction at their aperture, for example more than 300 μm. On the other hand, the size of point-lights in the array 28 can be as small as possible as long as they provide enough light intensity. When the aperture stop of each pinhole-aperture light-field is determined by the Fourier filter 54, the point-lights in the array 28 can have a larger diameter. Larger diameter point-lights compensate variations of the reflection angles of micromirrors in a DMD.

FIG. 9 illustrates the versatility of the basic light-field projection concept disclosed in this invention. The projector 62 in the embodiment of FIG. 9 is a modification of the fundamental design from FIG. 5*a*. The point-light array 28 in FIG. 9 is inclined in respect to an optical axis which causes that the image plane of the point-lights, which contains the virtual pinholes such as 20 and 22, is inclined too. This arrangement of projection can be accompanied with optical elements, such as the lens 52, which are also inclined in respect to the optical axis, and with corresponding transformation of the input images. The projected pinhole-aperture light-fields can be reflected from small inclined mirrors such as 58 at locations of the virtual pinholes such as 20 and 22 and directed to the viewer's eyes 132. The mirrors 58 can be placed on the surface or embedded inside transparent glasses in order to combine the artificial light-field 26 with the light-field from the real world 60. Such embodiment constitutes an augmented reality system. The mirrors 58 serve also as a Fourier filter which removes diffraction components from the light field 26.

FIG. 10 is an example of a practical arrangement of an augmented reality device comprising of two light field-projectors 62 and two arrays of inclined mirrors 58 on thin transparent glasses 64. The wide-aperture light-field 26 can be also injected into any suitable waveguide which guides the light-field 26 from projector to the eye pupil 10.

FIG. 11 is an alternative embodiment of the see-through box for an augmented or mixed reality device in which the location of each of the plurality of elements 29 coincides with the location of an image of the same or another element 29 in the optical system with the lens 52 and reflective surface of SLM 30. Since each element 29 comprises a point-light source such as 34 or 36 (while all point-light sources constitute the point-light array 28) and a mirror 58 or a semi-transparent mirror 59, each element 29 serves simultaneously as a source and a mirror in the Fourier filter 54. FIG. 11*b* shows that the point-light source 34 in an element 29 emits the radial pinhole-aperture light-field 38 which propagates through the lens 52, reflects from SLM 30 and propagates as a modulated light-field 16 again through the lens 52 to the apex of the cone of the pinhole-aperture light-field 16. The apex is the image of point-light source 34 and it is the virtual pinhole 20. Their location in this embodiment coincides with the location of a mirror 58 or 59 in another element 29. The another element 29 therefore serves as a filter which filters-out higher order diffraction satellites that were created by the reflection from SLM 30, from the light-field 26 and, at the same time, as a mirror which deflects the pinhole-aperture light-field 16 with desired angle to the eye pupil 10. FIG. 11*c* shows that the another point-light source 36 creates its image and the virtual pinhole 22 at mirror 58 or 59 of yet another element 29. The plurality of elements 29 hence works as an illumination source (point-light array) and a Fourier filter at the same time.

FIG. 12 is an alternative embodiment of the see-through box for a augmented or mixed reality device in which each element 29 is at the same time the point-light source and the filter of its own light-field. FIG. 12*b* shows that the point-light 34 in an element 29 emits light-field 38 which is modulated by SLM 30 and, due to the presence of the layer system 136, is retro-reflected as a light-field 16 back to the initial element 29. Hence the location of point-light source 34, its image, the filtering mirror 58 or 59, and the virtual pinhole 20 have the same location at the same element 29. FIG. 12*c* shows that another element 29 with another point-light source 36 has the same properties and performs the same operation with incident light-field 40, modulated light-field 18 and the virtual pinhole 22. FIG. 12*d* shows this alternative embodiment of the see-through box 134 with envelopes of simultaneously all pinhole-aperture light-fields which compose the artificially projected light-field 26. In real device the number, density and distribution of elements 29 in the transparent box 64 is expected to be different. Especially the number and density of elements 29 must be higher in order to create high quality light-field 26 and wide field of view. A device with large number of elements 29 can be operated in a mode where a only a subset of all elements 29 is active (performs repetitive illumination sequence) and provides light-field 26 from virtual objects that are located in the field of view determined by the position of the pupil 10 and the active elements 29. This mode allows to provide high quality light-field image of the projected objects which cover a narrow field of view and, at the same time, possibility to cover large field of view by changing the subset of active elements 29. In other words, the light-field information can be projected from any section of a large field of view, but only a narrow field of view can be filled with projected light-field at a given moment in order to provide detailed image of an object in a specific location. Mixed, augmented or virtual reality content can be created with this regards. Especially the mixed reality applications may exploit the fact, that a viewer sees the real world and the virtual object can occupy only a fraction of the full field of view at any specific moment. In the case of virtual reality (but also the mixed reality), the high quality image of a virtual object can be projected for a narrow section of the full field of view where the high density of elements 29 is active and where the viewer is optically and mentally focused while the sections of the field of view which correspond to the viewer's peripheral vision are provided only with low-quality light-field with low density of active elements 29. The latter could be improved by using an eye tracking which identifies the direction of viewer's visual attention.

FIGS. 12*e*, 12*f* and 12*g* show the alternative embodiment of the see-through light-field projector 134 with retroreflective display comprising the layer system 136 and SLM 30 which are located outside the transparent box 64 and where the incident light such as 38 or 40 and the light-field 26 propagate outside the box 64.

FIG. 13 describes several exemplar embodiments of the inner structure of the element 29. The idealized element 29 in FIG. 13*a* comprises a point-light source 34 and a partly-transparent and partly-reflective circular mirror 59 with diameter between 50 and 500 μm. The point-light source emits the radial light-field 38 which is modulated and retro-reflected from SLM 30 with layer system 136 as a radial light-field 16. The light-field 16 is reflected from mirror 59 to the eye pupil 10. The reflection from mirror 59 filters out the diffraction satellites created by the modulation of the incident light on SLM 30 from the light-field 26. The embodiment of element 29 in FIG. 13*b* represents a possible practical realization of the element 29 with light-source 34 such as single color LED with light forming optics 140 which, together with the light-absorbing coating 138, shapes and homogenizes the radial light-field 38, powering wires 142 and 144 which provide voltage and current to LED 34. These elements are attached to or deposited on a transparent holder 150. The light-source 34 can emit multiple colors which requires corresponding number of powering wires. For instance four wires for a three color LED. The semi-transparent mirror 59 through which the light-source 34 illuminates the SLM 30 can be deposited on another transparent holder 151 which is in contact with the transparent holder 150.

FIG. 13*c* is an embodiment of element 29 with fully reflective mirror 58 (although it can be in principle also semi-transparent mirror) placed next to the point-light source 34 which has identical or similar construction to that in FIG. 13*b*. The mirror 58 ideally covers up the light-source from the point of view of the pupil 10. Embodiments of element 29 in FIG. 13*d* and FIG. 13*e* are alternatives to the embodiments of element 29 in FIG. 13*b* and FIG. 13*c*. Here the point-light source 148 is not an active electronically powered light-source, but a diffusing element 148 which is illuminated by a concentrated light-beam 146 from sources 37 as shown in FIG. 13*g*.

Two basic embodiments of the layer system 136 which, in final consequence, causes retroreflection of light modulated by SLM 30, is shown in FIG. 14. The layer system 136 in FIG. 14*a* and FIG. 14*b* comprises an array of microlenses 158 which have focal length corresponding to the minimal distance between the center of the microlens 158 and the reflective surface 156 of SLM 30. The SLM 30 in this example is assumed to be the FLCOS which, hence, requires presence of a polarization filter 160 in the path of the incident rays 41 and the reflected rays 27 between the element 29 and reflective surface 156 of SLM 30. The filter transmits only one polarization component of incident ray 41 which propagates through a microlens 158 to the reflective surface 156 of the SLM 30. The incident ray 41 is either reflected with the same polarization from a bright pixel 152 which allows the transmit the reflected ray 27 through polarization filter 27, or is reflected from a dark pixel 154 with rotated polarization which causes that the reflected ray is blocked by the polarization filter 160. FIG. 14*b* illustrates absorption of a ray in the polarization filter 160 after its reflection from the dark pixel 154.

FIG. 14*c* and FIG. 14*d* illustrate another realization of a retroreflective display comprising layer system 136 and a reflective SLM 30. SLM 30 in this example is assumed to be DMD, but can be in principle any reflective light modulator. The layer system 136 comprises a grid of mirrors 166 that are parallel and perpendicular to each other and perpendicular to the mirrors corresponding to bright pixels.

Each mirror 162 corresponding to a bright pixel of SLM 30 constitutes with mirrors 166 a cube corner retroreflector. FIG. 14*d* illustrates also a reflection of an incident ray 41 from a mirror corresponding to a dark pixel 164. The mirror 164 is not perpendicular to the grid 166 and does not constitute a cube corner retroreflector. The ray 168 is therefore deflected to a direction in which it does not participate on the formation of the light-field 26.

The SLM 30 can be in principle any reflective light modulator and the disclosed embodiments are supposed to be illustrative and not restrictive. Indeed the SLM 30 can be even transmissive light modulator combined with a reflective surface.

FIG. 15 illustrates how the see-through light-field projectors 134 can constitute compact wearable mixed reality glasses. The SLM 30 with necessary control electronics 88 AND 90 can be located on the outer side of the glasses as seen in front and rear views of the glasses in FIG. 15*a* and FIG. 15*b* respectively, or can be located on inner sides of the glasses as seen in front and rear views in FIG. 15*c* and FIG. 15*d* respectively.

The present embodiments are to be considered as illustrative and not restrictive, as the invention is not to be limited to the details given herein.

REFERENCE NUMBERS AND SYMBOLS

- 10—pupil 92—synchronization signal
- 12—distant object 94—image signal
- 14—near object 96—illumination signal
- 16—pinhole-aperture light-field 98—active point-light
- 18—another pinhole-aperture light-field 100—inactive point-light
- 20—virtual pinhole 102—sequence of image components
- 22—another virtual pinhole 104—illumination on/off
- 24—retina 106—position of an active point-light
- 26—wide-aperture light-field 108—image frame
- 27—rays of radial light-field modulated by SLM 110—image component
- 28—point-light array 112—another image component
- 29—element with source of radial light and a mirror 114—illumination step
- 30—spatial light modulator SLM 116—another illumination step
- 32—guiding optics 118—image component sequence
- 34—point-light source 120—displayed image component
- 36—another point-light source 122—displayed image component
- 37—source of collimated light beam 124—displayed image component
- 38—incident radial light-field 126—displayed image component
- 40—another incident radial light-field 128—image sequence
- 41—rays of incident radial light-field 130—another image sequence
- 42—collimator 132—eye
- 44—total internal reflection prism 134—see-through box
- 46—eyepiece 136—layer system
- 48—virtual point object 138—light absorbing coating
- 50—source images of virtual point object 140—element
- 52—convex lens 142—transparent powering wire
- 54—Fourier filter 144—transparent powering wire
- 56—adjusting lens 146—light beam
- 58—inclined mirror 148—light diffusing element
- 59—partly-transparent mirror 150—first transparent holder
- 60—real world 151—second transparent holder
- 62—light-field projector engine 152—bright pixel of a reflective SLM
- 64—glasses, transparent box 154—dark pixel of a reflective SLM
- 66—always-in-focus retinal image 156—reflective surface of the SLM
- 68—another always-in-focus retinal image 158—microlens
- 70, 72—composed retinal image 160—polarization filter
- 74, 76—composed retinal image 162—micromirror of DMD display (bright pixel)
- 78, 80—composed retinal image 164—micromirror of DMD display (dark pixel)
- 82, 84—composed retinal image 168—light rays reflected from the micromirror corresponding to a dark pixel
- 86—composed retinal image 170—arms of the glasses
- 88—display control electronics 171—frame
- 90—illumination control electronics 172—visual axis

The invention claimed is:

1. Light-field projector for projecting a near-eye projected image to the eyes of a user, comprising:

a light source comprising a plurality of illumination point-lights configured for sequentially emitting a plurality of incident light fields;

a spatial light modulator configured for providing a sequence of source images;

the spatial light modulator being further configured for modulating each of the incident light-fields in accordance with the source images such as to project sequentially a plurality of pinhole-aperture light-fields, each pinhole-aperture light-fields carrying a light-field component from the source image;

wherein each sequentially projected pinhole-aperture light-field forms an intersection virtual pinhole through which the component from the source image can be seen, each virtual pinholes having an aperture stop which is determined by the size of the illumination point-light and being spatially shifted in relation with each other, the near-eye projected image being seen through the plurality of virtual pinholes;

wherein the light-field projector further comprises a display control electronics circuit configured for producing a plurality of sequences of source images on the spatial light modulator;

wherein the light-field projector further comprises an illumination control electronics circuit configured to provide a signal for controlling the plurality of illumination point-lights, the illumination control electronics circuit being configured to illuminate a sub-ensemble of the plurality of point-lights according to a time sequence function;

wherein the display control electronics circuit is further configured such that the sub- ensemble of the plurality of point-lights is varied for each sequence of source images; and the light-field projector further comprises an optical device configured for guiding said plurality of incident light fields from the light source to the spatial light modulator, and for guiding the pinhole-aperture light-fields between the spatial light modulator and the wide-aperture light-field.

2. The light-field projector according to claim 1, wherein the illumination control electronics circuit is further configured such that the plurality of point-lights is varied for each sequence of source images until all point-lights have been illuminated.

3. The light-field projector according to claim 1, wherein the illumination control electronics circuit is further configured to control the length of exposure of the source images by a time period during which one point-light illuminates with a specific average light intensity.

4. The light-field projector according to claim 1, wherein the optical device further comprises a Fourier filter between the spatial light modulator and the wide-aperture light-field.

5. The light-field projector according to claim 1, wherein the optical device further comprises a convex lens configured for performing optical Fourier transformation of the reflected pinhole-aperture light-fields.

6. The light-field projector according to claim 1, wherein the optical device further comprises a second optical element configured for concentrating the reflected pinhole-aperture light-fields within the wide-aperture light-field.

7. The light-field projector according to claim 1, wherein the source images comprise monochrome dithered images comprising a plurality of pixels, the density of bright pixels determining the brightness.

8. Augmented reality device destined to be worn by a user, comprising a light-field projector comprising:

a light source comprising a plurality of illumination point-lights configured for sequentially emitting a plurality of incident light fields;

a spatial light modulator configured for providing a sequence of source images;

the spatial light modulator being further configured for modulating each of the incident light-fields in accordance with the source images such as to project sequentially a plurality of pinhole-aperture light-fields, each pinhole-aperture light-fields carrying a light-field component from the source image;

wherein each sequentially projected pinhole-aperture light-field forms an intersection virtual pinhole through which the component from the source image can be seen, each virtual pinholes having an aperture stop which is determined by the size of the illumination point-light and being spatially shifted in relation with each other, the near-eye projected image being seen through the plurality of virtual pinholes;

wherein the light-field projector further comprises a display control electronics circuit configured for producing a sequence of source images on the spatial light modulator;

wherein the light-field projector further comprises an illumination control electronics circuit configured to provide a signal for controlling the plurality of illumination point-lights, the illumination control electronics circuit being configured to illuminate a sub-ensemble of the plurality of point-lights according to a time sequence function;

wherein the sub-ensemble of the plurality of point-lights is varied for each sequence of source images;

wherein the point-light source and the spatial light modulator are arranged such that the pinhole-aperture light-fields are projected along the visual axis of at least one eye of the user, such as to reach the eye retina, when the augmented reality device is worn;

wherein, when worn by the user, the point-light source and the spatial light modulator are arranged outside a visual field of the eyes; and wherein the light-field projector comprises a mirror configured for reflecting the pinhole-aperture light-fields along the visual axis.

9. The augmented reality device according to claim 8, wherein the mirror comprises a Fourier filter configured for removing diffraction components from the wide-aperture light-field.

10. The augmented reality device according to claim 8, wherein the mirror comprises a plurality of partially or totally reflective, sub-mirrors arranged in an array, each sub-mirror reflecting one of the pinhole-aperture light-fields.

11. The augmented reality device according to claim 8, wherein the near-eye projected image is combinable with a distant image formed by light-fields coming from objects at distance vision.

12. The augmented reality device according to claim 8, comprising eyeglasses, each glass of the eyeglasses comprising the mirror.

13. Method for operating the augmented reality device, comprising:

a light-field projector comprising:

a light source comprising a plurality of illumination point-lights configured for sequentially emitting a plurality of incident light fields;

a spatial light modulator configured for providing a sequence of source images;

the spatial light modulator being further configured for modulating each of the incident light-fields in accordance with the source images such as to project sequentially a plurality of pinhole-aperture light-fields, each pinhole-aperture light-fields carrying a light-field component from the source image;

wherein each sequentially projected pinhole-aperture light-field forms an intersection virtual pinhole through which the component from the source image can be seen, each virtual pinholes having an aperture stop which is determined by the size of the illumination point-light and being spatially shifted in relation with each other, the near-eye projected image being seen through the plurality of virtual pinholes;

wherein the light-field projector further comprises a display control electronics circuit configured for producing a sequence of source images on the spatial light modulator;

wherein the light-field projector further comprises an illumination control electronics circuit configured to provide a signal for controlling the plurality of illumination point-lights, the illumination control electronics circuit being configured to illuminate a sub-ensemble of the plurality of point-lights according to a time sequence function;

wherein the sub-ensemble of the plurality of point-lights is varied for each sequence of source images;

wherein the point-light source and the spatial light modulator are arranged such that the pinhole-aperture light-fields are projected along the visual axis of at least one eye of the user, such as to reach the eye retina, when the augmented reality device is worn;

the method comprising:

displaying a sequence of source images on the spatial light modulator;

illuminating the displayed source images with the light-field of radial rays;

wherein a sub-ensemble of the plurality of point-lights is illuminated according to a time sequence function;

wherein the display control electronics circuit and the illumination control electronics circuit are synchronized, each image frame comprising one selected point-light illuminating one corresponding image component displayed on the spatial light modulator with a specific average light intensity during a time period; and wherein illumination sequences are repeated with predefined transformations of illumination patterns until bit-planes of the image are illuminated with point-lights of the plurality of point-lights.

14. The method according to claim 13, further comprising varying the plurality of point-lights until all point-lights have been illuminated.

15. The method according to claim 13, further comprising controlling the length of exposure of the source images by illuminating the point-light with a specific average light intensity during a time period.

16. The method according to claim 13, wherein the near-eye projected image is combinable with a distant image formed by light-fields coming from objects at distance vision; and wherein the near-eye projected image is combined with the distant image by sequential illuminating the displayed source images with the light-field of radial rays.

* * * * *